United States Patent
Purgatorio et al.

(10) Patent No.: US 10,885,539 B1
(45) Date of Patent: Jan. 5, 2021

(54) DRIVING POINTS

(71) Applicant: Allstate Insurance Company, Northbrook, IL (US)

(72) Inventors: Ginger Purgatorio, Algonquin, IL (US); Orlando E. Mercado, Rolling Meadows, IL (US)

(73) Assignee: Arity International Limited, Belfast (IE)

( * ) Notice: Subject to any disclaimer, the term of this patent is extended or adjusted under 35 U.S.C. 154(b) by 750 days.

(21) Appl. No.: 14/926,793

(22) Filed: Oct. 29, 2015

(51) Int. Cl.
*G06Q 30/02* (2012.01)
*B60W 40/00* (2006.01)
*B60W 40/09* (2012.01)

(52) U.S. Cl.
CPC ......... *G06Q 30/0207* (2013.01); *B60W 40/09* (2013.01)

(58) Field of Classification Search
CPC .............. G06Q 30/02–0277; B60W 40/09
See application file for complete search history.

(56) References Cited

U.S. PATENT DOCUMENTS

| | | | | |
|---|---|---|---|---|
| 7,809,503 B2 * | 10/2010 | Nakamura | ......... | G01C 21/3415 701/414 |
| 10,013,697 B1 * | 7/2018 | Cote | ................... | G06Q 30/0208 |
| 2002/0178033 A1 * | 11/2002 | Yoshioka | ............... | G06Q 40/08 705/4 |
| 2010/0171267 A1 * | 7/2010 | Walker | ..................... | G07F 1/06 273/274 |
| 2010/0252998 A1 * | 10/2010 | Guidroz | ................ | A63F 3/0615 273/292 |
| 2011/0040579 A1 * | 2/2011 | Havens | .................. | G06Q 10/08 705/4 |
| 2012/0185282 A1 * | 7/2012 | Gore | ....................... | G06Q 40/08 705/4 |

(Continued)

FOREIGN PATENT DOCUMENTS

JP      2015057588 A  *  3/2015

OTHER PUBLICATIONS

Jiangqin Peng • Nanjie Liu • Haitao Zhao • Minglu Yu, "Usage-based insurance system based on carrier-cloud-client", 2015 10th International Conference on Communications and Networking in China (ChinaCom), Digital Object Identifier: 10.1109/CHINACOM. 2015.7498004, pp. 579-584. (Year: 2016).*

(Continued)

*Primary Examiner* — Raquel Alvarez
(74) *Attorney, Agent, or Firm* — Banner & Witcoff, Ltd.

(57) ABSTRACT

A safe driving currency system may obtain telematics data indicative of a driver's operation of a vehicle, determine whether a driver is engaged in safe operation of a vehicle, and award safe driving currency (e.g., driving points) for operating the vehicle in a safe manner. The driver may also enter safe driving tournaments to obtain safe driving currency. The driver may then use the safe driving currency to obtain user-selectable electronic and/or real-world benefits. For instance, the driver may use the safe driving currency to purchase an item in a video game or a physical good or service from a vendor (e.g., hotels, gas stations, coffee shops, online stores, etc.). As the driver traverses a route, the driver may be notified of vendors along the route at which the driver may spend the driver's safe driving currency.

15 Claims, 10 Drawing Sheets

(56) References Cited

U.S. PATENT DOCUMENTS

| | | | | |
|---|---|---|---|---|
| 2013/0054311 A1* | 2/2013 | Kataria | ............... | G07B 15/02 |
| | | | | 705/13 |
| 2014/0195272 A1* | 7/2014 | Sadiq | ................. | G06Q 40/08 |
| | | | | 705/4 |
| 2014/0358667 A1* | 12/2014 | Beltramo, Jr. | ..... | G06Q 30/0243 |
| | | | | 705/14.42 |
| 2014/0372152 A1* | 12/2014 | Noach | ................ | G06Q 40/02 |
| | | | | 705/4 |
| 2015/0039350 A1* | 2/2015 | Martin | ............ | G06Q 30/0261 |
| | | | | 705/4 |

OTHER PUBLICATIONS

"Usage-based Insurance System based on carrier-cloud-client" by Peng Jiangqin et al. publication date Aug. 1, 2015, 2015 10th International Conference on Communications and Networking in China (ChinaCom), pp. 579-584 (Year: 2015).*

\* cited by examiner

DRIVING POINTS

TECHNICAL FIELD

Aspects of the disclosure generally relate to computer systems and computer software. For instance, aspects of this disclosure provide systems and methods for awarding drivers electronic safe driving currency (e.g., driving points) for safe operation of a vehicle for use in purchasing electronic and real-world user-selectable benefits; systems and methods for discovering establishments along a user's route at which a driver may purchase such benefits; systems and methods for obtaining safe driving currency by winning safe driving tournaments; systems and methods for obtaining a driving score of a public transport as a rider approaches the public transport; and systems and methods for using gaming behavior to determine an insurance premium.

BACKGROUND

Unsafe driving such as speeding above the posted speed limit of a road is a common cause of car accidents and the associated repair and medical costs can be significant for the persons involved and their insurance companies. However, currently, there are very few incentives for a driver to operate his or her vehicle safely (e.g., by traveling at a speed below the posted speed limit). In many instances, speeding tickets or other moving violations issued by law enforcement professionals provide little incentive for drivers to drive safely. Insurance companies offer lower insurance premiums to drivers with little or no moving violations and speeding tickets. However, for some drivers, a discount in an insurance premium may provide little incentive to drive safely.

Accordingly, new systems, devices, methodologies, and software are desired to incentive drivers through the use of intangible and tangible user-selected benefits acquired as a result of improving their driving skills and driving more safely to thereby reduce (or prevent) accidents and their associated costs.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure address one or more issues discussed above by disclosing methods, computer readable media, software systems, and apparatuses for obtaining telematics data, determining whether a driver is engaged in safe operation of a vehicle, and providing an interactive software application that presents electronic and real-world benefits for safe operation of the vehicle. For instance, the application may award the driver with electronic safe driving currency (e.g., driving points) that may be used in one or more electronic games and/or one or more real-world establishments (e.g., hotels, gas stations, coffee shops, online stores, etc.), and may notify the drivers of the real-world benefits as they near establishments along their route. Further, a driver may obtain additional electronic safe driving currency by winning safe driving contests such as "knockout tournaments" where a driver (or group of drivers) compete against another driver (or group of drivers) to determine who can obtain a higher safe driving score during a particular time period. The winner may advance to a next round until there is only one winner left, who may then receive an electronic safe driving currency bonus. Additional aspects of the disclosure relate to using a driver's electronic gaming information in determining the driver's insurance premium. Yet additional aspects of the disclosure relate to incentivizing drivers of public transport to drive safely by notifying potential passengers of the driver's driving score as they enter or approach the vehicle.

In some embodiments, a system may include a driving analysis server that has a processor unit and a memory unit. The memory unit may store computer-readable instructions that, when executed by the processing unit, cause the system to perform one or more steps. The system may receive telematics data associated with a vehicle and determine a safe driving score for a driver of the vehicle based on the safe driving score. The system may award an amount of safe driving currency to the driver based on the safe driving score. The system may send, to a mobile device of the driver, a message including the awarded amount of safe driving currency, third-party vendors that accept the safe driving currency, and location information of at least a subset of the third-party vendors.

In some embodiments, a computing device may identify gaming behaviors of safe drivers that are different from gaming behaviors of unsafe drivers. The computing device may generate one or more rules for use in determining an insurance premium. The one or more rules may be based on the identified gaming behaviors of safe drivers that are different from the gaming behaviors of unsafe drivers. The computing device may receive an application for insurance from an applicant. The computing device may obtain gaming data of the applicant and apply the gaming data of the applicant to at least one rule of the one or more rules to determine an insurance premium for the applicant.

In some embodiments, an apparatus may include a processor and a memory. The memory may store computer-readable instructions that, when executed by the processor, cause the apparatus to perform one or more steps. For instance, the apparatus may receive, from contestants, registrations to compete in a safe driving contest. The apparatus may set up a first round of matches with each match placing two contestants against one another. The apparatus may receive telematics data for each contestant over a particular time period and determine a safe driving score for each contestant based on the telematics data of the contestant. The apparatus may determine a winner of each match based on which one of the two contestants has a higher safe driving score. In response to determining that there are multiple winners in the first round of matches, the apparatus may set up a second round of matches with the winners of each match form the first round of matches. In response to determining that there is only one winner left, the apparatus may award safe driving currency to that winner.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

Figure 1:
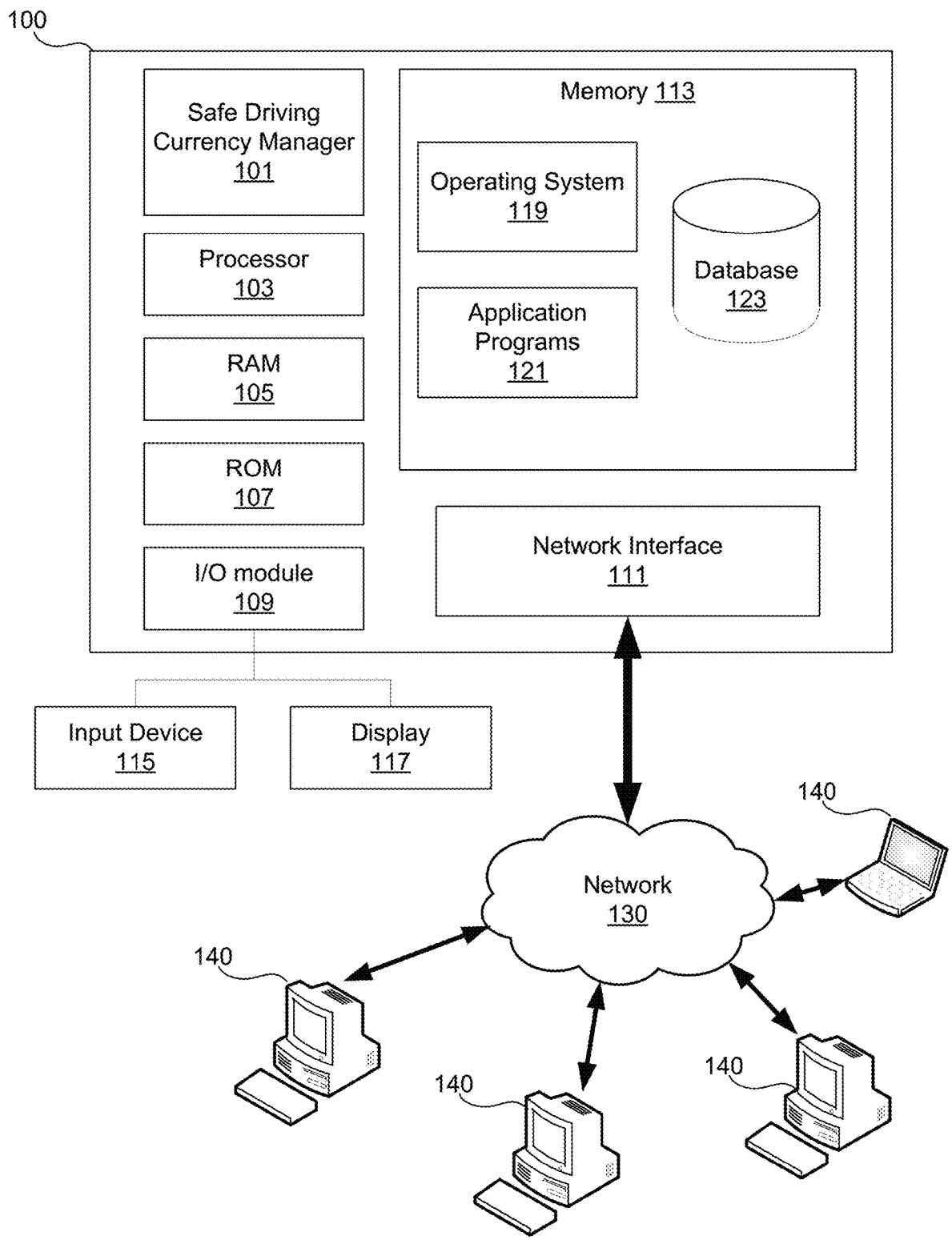
FIG. 1 is a block diagram of an example computing device that may be used according to an illustrative embodiment of the present disclosure.

In the following description of the various embodiments, reference is made to the accompanying drawings, which form a part hereof, and in which is shown by way of illustration, various embodiments of the disclosure that may be practiced. It is to be understood that other embodiments may be utilized.

Aspects of the disclosure address a safe driving currency system that obtains telematics data of a driver's operation of a vehicle and awards safe driving currency (e.g., driving points) that the driver may then use to purchase a benefit (e.g., an object in a video game, a coffee at a coffee shop, etc.). By providing benefits other than avoiding tickets from law enforcement professionals, drivers are incentivized to safely operate their vehicles. Additionally, the safe driving currency system may notify the drivers of establishments (e.g., coffee shops, etc.) that accept safe driving currency that are near (e.g., within a threshold distance of) their vehicle or along their route.

In addition to providing drivers with safe driving currency for safely operating a vehicle during a trip, the safe driving currency system may also award safe driving currency to drivers who obtain a streak of safe driving trips during which they safely operated the vehicle, award safe driving currency to drivers who perform a set number of safe driving trips (e.g., by filling a stamp booklet where a driver may obtain a stamp for safe operation of the vehicle during the trip), and awarding safe driving currency to drivers who win safe driving knockout tournaments. To win the tournament, a driver may win multiple rounds of matches against other contestants where the person or organization wins a round by having a higher safe driving score than their opponent. The losing opponent may be eliminated from the tournament.

Additional aspects of the disclosure relate to using a driver's electronic gaming information in determining the driver's insurance premium. Yet additional aspects of the disclosure relate to incentivizing drivers of public transport to drive safely by notifying potential passengers of the driver's driving score as they enter or approach the vehicle.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

In one or more arrangements, teachings of the present disclosure may be implemented with a computing device. FIG. 1 illustrates a block diagram of an example computing device 100 that may be used according to an illustrative embodiment of the present disclosure. The computing device 100 may be similar to any available computing device, such as a personal computer (e.g., a desktop computer), server, laptop computer, notebook, tablet, smartphone, etc. The computing device 100 may have a safe driving currency manager 101 for performing methods described herein. The safe driving currency manager 101 may be implemented with a processor and memory. Throughout this disclosure, the safe driving currency manager 101 may be used to reference a combination of the processor and memory storing instructions executed by that processor and/or the instructions themselves. The processor of the safe driving currency manager 101 may operate in addition to or in conjunction with another processor 103 of the computing device 100. Both the safe driving currency manager 101 and the processor 103 may be capable of controlling operations of the computing device 100 and its associated components, including RAM 105, ROM 107, an input/output (I/O) module 109, a network interface 111, and memory 113.

The I/O module 109 may be configured to be connected to an input device 115, such as a microphone, keypad, keyboard, touchscreen, and/or stylus through which a user of the computing device 100 may provide input data. The I/O module 109 may also be configured to be connected to a display device 117, such as a monitor, television, touchscreen, etc., and may include a graphics card. The display device 117 and input device 115 are shown as separate elements from the computing device 100, however, they may be within the same structure. Using the input device 115, system administrators may update various aspects of the safe driving currency manager 101, such as safe driving parameters or rules for awarding safe driving currency, described in further detail below. On a client-side computing device 100, the input device 115 may be operated by users to interact with the safe driving currency manager 101, including being presented with safe driving currency for operating a vehicle in a safe manner, receiving user-selections to obtain awards using safe driving currency, etc., as described in further detail below.

The memory 113 may be any computer readable medium for storing computer executable instructions (e.g., software). The instructions stored within memory 113 may enable the computing device 100 to perform various functions. For example, memory 113 may store software used by the computing device 100, such as an operating system 119 and application programs 121, and may include an associated database 123.

The network interface 111 allows the computing device 100 to connect to and communicate with a network 130. The network 130 may be any type of network, including a local area network (LAN) and/or a wide area network (WAN), such as the Internet. Through the network 130, the computing device 100 may communicate with one or more computing devices 140, such as laptops, notebooks, smartphones, personal computers, servers, etc. The computing devices 140 may also be configured in the same manner as computing device 100. In some embodiments the computing device 100 may be connected to the computing devices 140 to form a "cloud" computing environment.

The network interface 111 may connect to the network 130 via communication lines, such as coaxial cable, fiber optic cable, etc. or wirelessly using a cellular backhaul or a wireless standard, such as IEEE 802.11, IEEE 802.15, IEEE 802.16 etc. In some embodiments, the network interface may include a modem. Further, the network interface 111 may use various protocols, including TCP/IP, Ethernet, File Transfer Protocol (FTP), Hypertext Transfer Protocol (HTTP), etc., to communicate with other computing devices 140.

The computing device 100 may be a mobile device (e.g., a smartphone), and thus, may also include various other components, such as a battery, speaker, global positioning system (GPS), camera, microphone, and antennas (not shown).

Figure 2:
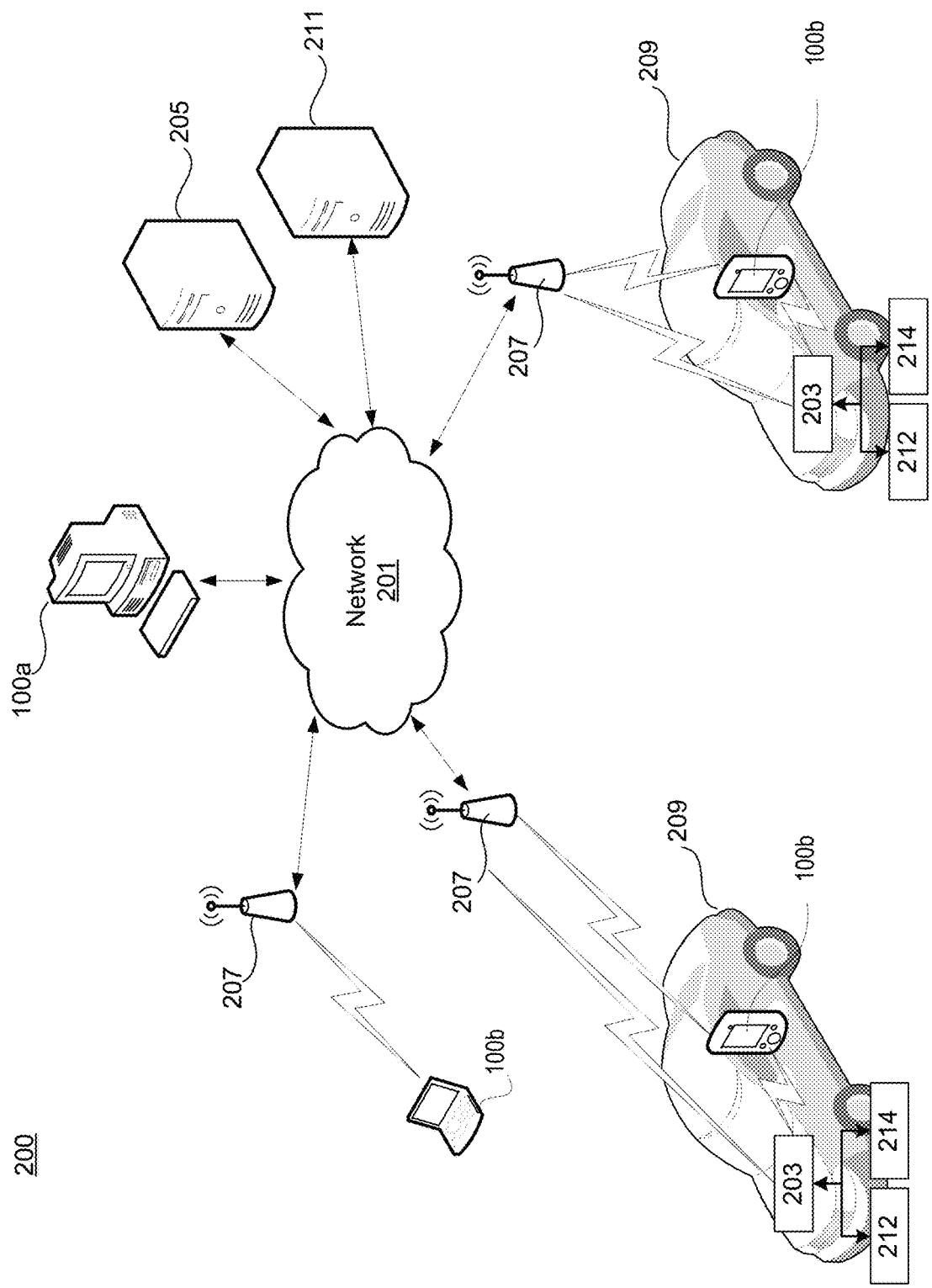
FIG. 2 illustrates an example network environment for implementing aspects of the present disclosure.

The safe driver application disclosed herein may be implemented on a computing device 100 used in various network environments. FIG. 2 illustrates an example network environment 200 for implementing methods according to the present disclosure. As shown in FIG. 2, the network environment 200 may include a network 201 configured to connect one or more server-side computing devices 100a with one or more client-side computing devices 100b. The network environment 200 of FIG. 2 may also include one or more vehicle computing devices 203 (such as on-board vehicle computing devices), application servers 205, and access points 207. The network 201 may be any type of network, e.g., the network 130 described above. In particular, the network 201 may include a cellular network and its components, such as base stations, cell towers, etc.

Referring to FIG. 2, the server-side computing device 100a may be configured to generate, edit, manage, and deliver the safe driver application. The safe driver application may be downloaded, installed, and executed on one or more of the client-side computing devices 100b. In some examples, the server-side computing device 100a may execute the safe driver application in tandem with a client-side computing device 100b. The server-side computing device 100a may, for example, render graphics and webpages which are then streamed to the client-side device 100b which may be used to supply user inputs so that the user may interact with the safe driver application. As shown in FIG. 2, the client-side computing device 100b may be a portable user device, such as a smartphone, tablet, laptop, etc., that a user may take with them into a vehicle 209. Although FIG. 2 shows the vehicles 209 as being cars, vehicles 209 may include motorcycles, trucks, buses, boats, etc. In one example, client-side device 100b may be a mobile phone or tablet with a safe driver application mobile application installed thereon. The client-side device 100b may include a touch screen to display user interfaces of the safe driver application and receive user touch input to select displayed objects. The client-side device 100b may also include a location determination component such as a global positioning system (GPS) which may determine the location of the mobile phone. The location information may be in the form of a set of longitude and latitude coordinates. The client-side device 100b may retrieve information and store information from other devices in network environment 200. For instance, client-side device 100b may retrieve and store reward options, safe driving currency information, third-party entity location information, mobile device location information, and/or other information discussed herein.

While a client-side computing device 100b is inside or near a vehicle 209, it may communicate with the vehicle's computing device 203 (also referred to herein as a telematics device). In some examples, the vehicle's computing device 203 may include the vehicle's on-board diagnostic (OBD) system. The client-side computing device 100b may communicate with the vehicle's computing device 203 via a wired connection (e.g., OBD II connector) or a wireless connection (e.g., Bluetooth).

In some embodiments, the safe driver application may be downloaded, installed, and delivered to a vehicle's computing device 203. That is, a vehicle computing device 203 may have similar functionality that a smartphone, tablet, or other client-side computing device 100b may have. A vehicle's computing device 203, therefore, may be used to interact with the safe driver application. In some cases, the vehicle computing device 203 might only operate certain modules of the safe driver application related to driving, such collecting driving data, computing drive scores, etc., while in other cases all modules of the safe driver application may be implemented using the vehicle's computing device 203. Indeed, even the operations of the safe driving application described herein may be performed through the vehicle computing device 203 (with or without an additional client-side computing device 100b), so that the vehicle computing device 203 effectively operates as a client-side computing device 100b. Thus, herein, where features of the safe driver application are described as being performed by a client-side computing device 100b, it should be understood that they may be performed by a vehicle computing device 203.

In some examples, aspects of the disclosure may be implemented by a client-side computing device 100b and a vehicle computing device 203 in tandem. For example, a user may select a key to view the user's current amount of safe driving currency on their client-side computing device 100b (e.g., phone), and then select another key on the vehicle computing device 203 to begin purchase a benefit (e.g., obtain a status in a particular electronic game) using the safe driving currency.

Further, either one or both of the client-side computing device 100b or the vehicle computing device 203 may collect telematics data. Computing device 203 may contain many or all of the hardware/software components as computing device 100 depicted in FIG. 1. Computing device 203 may receive vehicle operation and driving data (e.g., telematics data) from vehicle sensors 212, and proximity sensors and cameras 214, and may transmit the telematics data to one or more external computer systems (e.g., a vehicle operation computer system and/or application server 205) over a wireless transmission network. Computing device 203 also may be configured to detect or determine additional types of telematics data relating to real-time driving and the condition of the vehicle 209. In certain embodiments, the telematics device 203 may contain or may be integral with one or more of the vehicle sensors 212 and proximity sensors and cameras 214.

Additionally, the computing device 203 may be configured to collect telematics data regarding the number of passengers and the types of passengers (e.g. adults, children, teenagers, pets, etc.) in the vehicle 209. The computing device 203 also may be configured to collect telematics data indicating a driver's movements or the condition of a driver. For example, the computing device 203 may include or communicate with sensors that monitor a driver's movements, such as the driver's eye position and/or head position, etc. Additionally, the computing device 203 may collect data regarding the physical or mental state of the driver, such as fatigue or intoxication. The condition of the driver may be determined through the movements of the driver or through sensors, for example, sensors that detect the content of alcohol in the air or blood alcohol content of the driver, such as a breathalyzer.

The computing device 203 also may collect telematics data regarding the driver's route choice, whether the driver follows a given route, and to classify the type of trip (e.g. commute, errand, new route, etc.). In certain embodiments, the computing device 203 may be configured to communicate with the sensors and/or cameras to determine when and how often the vehicle 209 stays in a single lane or strays into other lanes. To determine the vehicle's route, lane position, and other data, the computing device 203 may include or may receive data from a mobile telephone, a Global Positioning System (GPS), locational sensors positioned inside a vehicle, or locational sensors or devices remote from the vehicle 209.

As discussed above, vehicles 209 may include vehicle operation sensors 212 capable of detecting and recording telematics data (e.g., various conditions at the vehicle and operational parameters of the vehicle). For example, the sensors may detect and store data corresponding to the vehicle's speed, distances driven, rates of acceleration or braking, and specific instances of sudden acceleration, braking, and swerving. The sensors also may detect and store data received from the vehicle's internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, maintenance performed on the vehicle, and other data collected by the vehicle's computer systems. Additional sensors may detect and store the external driving conditions, which may also be referred to herein as telematics data, (for example, external temperature, rain, snow, light levels, and sun position for driver visibility). The sensors also may detect and store telematics data relating to moving violations and the observance of traffic signals and signs by the vehicle 209. Additional sensors may detect and store telematics data relating to the maintenance of the vehicle 209, such as the engine status, oil level, engine coolant temperature, odometer reading, the level of fuel in the fuel tank, engine revolutions per minute (RPMs), and/or tire pressure.

The operational sensors 212 and the cameras and proximity sensors 214 may store data within the vehicle 209, and/or may transmit the data to one or more external computer systems (e.g., the application server 205). As shown in FIG. 2, the operation sensors 212, and the cameras and proximity sensors 214, may be configured to transmit data to the application server 205 via a computing device 203. In other examples, one or more of the operation sensors 212 and/or the cameras and proximity sensors 214 may be configured to transmit data directly without using the computing device 203. For example, the computing device may be configured to receive and transmit data from operational sensors 212, while one or more cameras and proximity sensors 214 may be configured to directly transmit data to the application server 205 without using the computing device 203. Thus, the computing device 203 may be optional in certain embodiments where one or more sensors or cameras within the vehicle 209 may be configured to independently capture, store, and transmit vehicle operation and driving data.

Client-side computing device 100b may be located within a vehicle 209, such as a driver's or passenger's smartphone, tablet computer, or other personal mobile device. As used herein, client-side computing device 100b being "within" a vehicle 209 refers to a mobile device that is inside of or otherwise secured to a moving vehicle, for instance, mobile devices in the cabins of automobiles, buses, recreational vehicles, mobile devices traveling in open-air vehicles such as motorcycles, scooters, or boats, and mobile devices in the possession of drivers or passengers of vehicles 209.

Client-side computing device 100b may be configured to establish communication with vehicle-based devices (e.g., sensors, on-board vehicle computing devices, etc.) and various internal components of vehicle 209 via wireless networks or wired connections (e.g., for docked devices), whereby such client-side computing devices 100b may have secure access to internal vehicle sensors 212, camera/proximity sensors 214 and other vehicle-based systems. However, in other examples, client-side computing device 100b might not connect to vehicle-based computing devices and internal components, but may operate independently by communicating with vehicles 209 via standard communication interfaces (e.g., short-range communication systems, computing device 203, etc.), indirectly through external networks and servers, or might not communicate at all with vehicles 209.

Client-side computing device 100b may include a network interface, which may include various network interface hardware (e.g., adapters, modems, wireless transceivers, etc.) and software components to enable client-side computing devices 100b to communicate with external servers (e.g., application server 205), vehicles 209, and various other external computing devices. One or more specialized software applications, such as a telematics data acquisition application may be stored in the memory of the client-side computing device 100b. Application(s) may be received via network interface from application server 205, vehicles 209, or other application providers (e.g., public or private application stores). Certain applications might not include user interface screens, while other applications may include user interface screens that support user interaction. Such applications may be configured to run as user-initiated applications or as background applications. The memory of client-side computing device 100b also may include databases configured to receive and store accident data, vehicle data, driver or passenger data, insurance data, and the like, associated with one or more drivers and/or vehicles.

Like the vehicle-based computing devices in vehicles 209, client-side computing device 100b also may include various components configured to sense (e.g., generate or acquire) telematics data (e.g., geographic location, heading, route, linear velocity, angular velocity, acceleration, deceleration, driver data, weather data, and/or other telematics data discussed herein) and transmit the telematics data or other relevant data to application server 205 for determining whether the driver is operating the vehicle safely and should be awarded safe driving currency as discussed in further detail below. For example, using data from movement sensors (e.g., 1-axis, 2-axis, or 3-axis accelerometers, compasses, speedometers, vibration sensors, gyroscopic sensors, etc.) and/or GPS receivers or other location-based services (LBS), an application of client-side computing device 100b may determine that the client-side computing device 100b is in a moving vehicle, that a driving trip has started or stopped. The movement sensors and/or GPS receiver or LBS component of a client-side computing device 100b may also be used to determine driving speeds, routes, and accident-related data.

The vehicle 209 and the client-side computing device 100b may communicate with each other via wireless networks or wired connections (e.g., for devices physically docked in vehicles), and each may communicate with one or more additional vehicles 209, additional mobile computing devices, and/or a number of external computer servers (e.g., application server 205) over one or more communication networks (e.g., cellular communication network, WiFi communication network, etc.). The sensor data also may be transmitted from vehicles 209 via a computing device 203 or other network interface(s) to one or more remote computing devices, such as one or more client-side computing devices 100b and/or external servers (e.g., application server 205). For example, client-side computing device 100b may transmit telematics data, driver data, vehicle data (e.g., braking, linear acceleration, angular velocity, etc.), directly to application server 205, and thus may be used in conjunction with or instead of computing devices 203. Additionally, client-side computing device 100b (and/or computing device 203) may be configured to perform the vehicle-to-vehicle (V2V) and vehicle-to-infrastructure (V2I) communications described below, by establishing connections and transmitting/receiving telematics data to and from other nearby vehicles. Thus, client-side computing device 100b (and/or computing device 203) may be used in conjunction with, or instead of, a short-range communication system, which is described further below. In addition, client-side computing device 100b may be used in conjunction with the vehicle control computers for purposes of vehicle control and diagnostics.

Application server 205 may be a computing device separate from the vehicle 209, containing some or all of the hardware/software components as the computing device 100 depicted in FIG. 1. The application server 205 may be configured to receive and store the vehicle operation data discussed above from vehicle 209, and similar vehicle operation data from one or more other vehicles. In the example shown in FIG. 2, the application server 205 includes a vehicle operation database that may be configured to store the vehicle operation data collected from the vehicle sensors 212, proximity sensors 214 and cameras 214, and computing devices 203 of a plurality of vehicles. The vehicle operation database may store operational sensor data, proximity sensor data, camera data (e.g., image, audio, and/or video), location data and/or time data for multiple vehicles 209.

The application server 205 may include hardware, software, and network components to receive vehicle operation data from the vehicle operation computer system and/or directly from a plurality of vehicles 209 and/or a plurality of client-side computing devices 100b respectively disposed within the plurality of vehicles. The application server 205 and the vehicle operation computer system may be implemented as a single server/system, or may be separate servers/systems. In some examples, the application server 205 may be a central server configured to receive vehicle operation data from a plurality of remotely located vehicle operation computer systems.

As shown in FIG. 2, application server 205 may store one or more driving event analysis algorithms and determination of safe driving currency algorithms, which may be executed by one or more software applications running on generic or specialized hardware within the application server 205. The application server 205 may use the vehicle operation data received from the vehicle operation computer system and/or additional image data, video data, and/or object proximity data to perform driving event analyses for vehicles 209. The application server 205 may use the results of the driving event analysis to determine whether to award safe driving currency to a driver and, if so, how much safe driving currency to award.

Additionally, FIG. 2 shows that the network environment 200 may include access points 207, which may include cellular network components (e.g., cell towers, base stations, etc.), global positions system components (e.g., antennas, satellites, etc.), and other wireless access components (e.g., routers), for connecting the client-side computing devices 100b and/or vehicle computing devices 203 to the network 201. As such, through the network 201, the client-side computing devices 100b and/or vehicle computing devices 203 may communicate with application servers 205 to obtain various information, such as the time of day, weather information, traffic information, position information, software updates, etc.

In some embodiments, one or more of the application servers 205 may be configured to provide a service that receives telematics data from users and converts the telematics data into safe driving currency that may be used in various video games and/or with one or more other entities (e.g., hotels, coffee shops, etc.). For example, a user may provide his/her telematics data to an application server 205, which may analyze the telematics data and determine that the user is eligible for safe driving currency that can be used to obtain a variety of benefits. The application server 205 may include software for applying rules to the telematics data to determine how much safe driving currency to award to a driver for driving in accordance with one or more safe driving parameters.

To implement such embodiments, a database may be included within the application server 205 to store user identification information in association with the received telematics data and/or driving assessment information, (including driving scores). The database may also store the driver's safe driving currency account information (e.g., balance, transaction history, etc.). For each trip that a driver accomplishes in accordance with one or more specified safe driving parameters, the driver may be awarded safe driving currency with which the driver may use to obtain one or more driver-selected benefits. Users motivated to receive rewards may be motivated to use the safe driver application, which in turn may motivate users to improve their driving skills and practice safe driving behavior. The user may have to safely perform a number of drives in order to obtain a safe driving currency bonus. Therefore, the application server 205 may be configured to maintain records of users' past accomplishments so that users can work towards their rewards.

The network environment 200 may include one or more servers 211 for one or more third party entities (e.g., hotels, electronic game providers, coffee shops, online stores, or other business entities offering products or services). Third party entities may partner with an entity such as insurance provider providing the safe driving currency. Servers 211 may communicate with other devices of network environment 200 including, for example, server-side computing devices 100a, client-side computing devices 100b, and/or application servers 205. Servers 211 may inform the other devices of a variety of information. As an example, servers 211 may inform benefits/rewards a driver may obtain in exchange for safe driving currency and how much safe driving currency each benefit may cost. As another example, servers 211 may inform the other devices of their name and geographic location (e.g., GPS longitude and latitude coordinates). As yet another example, when a driver spends safe driving currency on a benefit at a third-party entity, its server 211 may inform the other devices so that the devices may deduct the driver's safe driving currency account by the cost of the purchased benefit/rewards. For instance, if a driver obtains a benefit (e.g., a coffee) from a coffee shop for 10 points of safe driving currency, the balance of points in the driver's safe driving account may be reduced by 10 points of safe driving currency.

Figure 3:
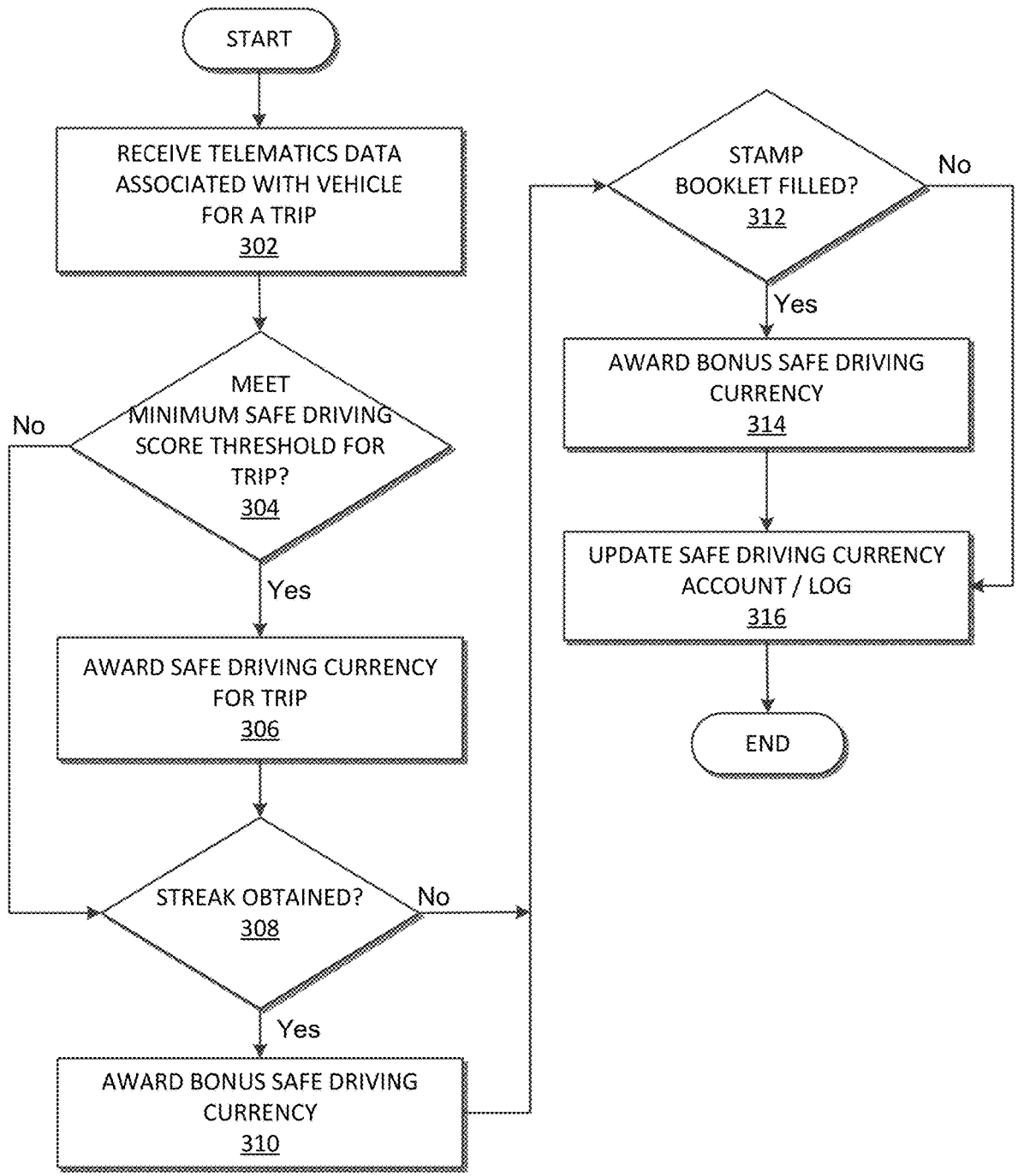
FIG. 3 depicts an illustrative flow diagram for an example method of awarding a driver safe driving currency for safe operation of a vehicle, according to one or more aspects of the disclosure.

FIG. 3 depicts an illustrative flow diagram for an example method of awarding a driver safe driving currency for operating a vehicle in a safe manner, according to one or more aspect of the disclosure. The method of FIG. 3 and/or one or more steps thereof may be performed by a computing device (e.g., server-side computing devices 100a and/or application server 205). The method illustrated in FIG. 3 and/or one or more steps thereof may be partially or fully embodied, for example, in computer-executable instructions that are stored in a computer-readable medium, such as a non-transitory computer-readable memory. In some instances, one or more steps of FIG. 3 may be performed in a different order and/or combined. In some instances, one or more steps of FIG. 3 may be omitted and/or otherwise not performed.

The steps in the example method of FIG. 3 describe a method of awarding a driver safe driving currency for safely operating a vehicle. For instance, either during or at the conclusion of a trip, server-side computing devices 100a, client-side computing devices 100b, and/or application server 205 may receive telematics data of vehicle 209 being operated by a driver and a driver identifier. Such device may analyze the telematics data to determine how safe a driver is operating the vehicle, and award safe driving currency based on how safe the driver operating the vehicle. The driver may then spend the safe driving currency at one or more third-party vendors to obtain a benefit or reward.

As shown in FIG. 3, the method may begin at step 302 in which a computing device (e.g., server-side computing devices 100a and/or application server 205) may receive telematics data from a vehicle 209. As an example, the telematics data may be received from one or more of the vehicle operation sensors 212, computing device 203, and/or camera and proximity sensors 214. In some instances, such devices may begin recording telematics data in response to the vehicle being turned on, being moved, or some other triggering event defined by application server 205. Such device may then transmit the telematics data at the end of the trip (e.g., when the vehicle is turned off or stopped for at least a preset minimum period of time).

In one or more arrangements, client-side computing devices 100b may receive telematics data of a vehicle from one or more of vehicle's vehicle operation sensors 212, computing device 203, and camera and proximity sensors 214, and relay that information to server-side computing devices 100a and/or application server 205. Additionally or alternatively, client-side computing devices 100b may generate telematics data using its own processor, GPS component, accelerometer, gyroscope, camera, microphone and other sensor devices of client-side computing devices 100b. In some instances, an application (e.g., mobile app) installed on client-side computing devices 100b may detect when it (and, thus, its user or owner) have begun a trip in a moving vehicle and record acceleration, deceleration, lateral movement, geographic location and other telematics data of mobile device 100b, which may correlate and/or otherwise represent the telematics data of the vehicle 209 in which mobile device 100b is disposed and/or otherwise located within. Client-side computing devices 100b may detect that a trip has begun in response to determining that client-side computing devices 100b is moving beyond a preset minimum speed (e.g., 20 mph) for at least a preset minimum duration (e.g., 2 minutes).

Telematics data may include, for example, sensor data, geographic location data, linear acceleration data, linear deceleration data, linear velocity, lateral orientation, angular rotational velocity, angular rotational acceleration, orientation relative to Earth's magnetic field, image data, video data, audio data, route, street name, navigational directions, status of components of the vehicle (e.g., brake activated), or any other data describing the behavior of the vehicle discussed herein.

At step 304, a computing device (e.g., server-side computing devices 100a and/or application server 205) may determine whether the driver met a minimum safe driving score threshold for a trip. Rules for determining a safe driving score may be stored by the server-side computing devices 100a and/or application server 205. A safe driver score may be determined based on his or her vehicle's telematics data. In some instances, a person assigned to the vehicle may be associated with the safe driver score even if another person drives the vehicle. In other instances, the driver of the vehicle may be specifically identified so that the driver score is associated with the person who actually drove the vehicle. For instance, the computing device may identify the driver from driver identification information received from client-side computing devices 100b.

As used herein, a safe driver score (or driver score) may refer to a measurement of driving abilities, safe driving habits, and other driver information. A driver score may be a rating generated by an insurance provider, financial instruction, or other organization, based on the driver's age, vision, medical history, driving record, and/or other account data relating to the driver. For example, an insurance provider server may periodically calculate driver scores for one or more of the insurance provider's customers, and may use the driver scores to perform insurance analyses and determinations (e.g., determine coverage, calculate premiums and deductibles, award safe driver discounts, etc.). As discussed herein, the driver score may be increased or decreased based on real-time data collected by vehicle sensors, telematics devices, and other systems for measuring driving performance. For example, if a driver consistently drives within posted speed limits, wears a seatbelt, and keeps the vehicle in good repair, the driver score may be positively adjusted (e.g., increased). Alternatively, if a driver regularly speeds, drives aggressively, and does not properly maintain the vehicle, the driver score may be negatively adjusted (e.g., decreased). It should be understood that a driver score, as used herein, may be associated with an individual, group of individuals, or a vehicle. For instance, a family, group of friends or co-workers, or other group that shares a vehicle, may have a single driver score that is shared by the group. Additionally, a vehicle may have an associated driver score that is based on one or more primary drivers of the vehicle and can be affected by the driving behavior of any the vehicle's drivers. In other examples, a vehicle may be configured to identify different drivers, and each driver of the vehicle may have a separate driver score.

The higher the safe driving score for a driver, the fewer high-risk or unsafe driving events were performed by the driver. The computing device may identify high-risk or unsafe events performed by the vehicle from the telematics data, for example, by comparing values of the telematics data with preset dynamic thresholds, or combinations of thresholds. The preset thresholds may be dynamically adjusted based on weather and road conditions present during the driver's trip, which may be retrieved by the computing device from a weather providing service. For instance, the thresholds may have different values for dry weather conditions, rain, snow, sleet, fog, daytime, night time, road construction, and/or combinations thereof. As an example, a maximum speed threshold used in determining an excessive speeding event may be 50 miles per hour on a particular road during the daytime and when the road is dry. However, the maximum speed threshold may be 30 miles per hour on the particular road during the night time and when the road is wet (e.g., when it is raining).

The driver score may account for numerous other high-risk or unsafe driving events, which may negatively affect (e.g., reduce) the driver score. As an example, an excessive speeding event may be a high-risk or unsafe driving event in which the vehicle's speed or velocity is greater than a maximum speed threshold (e.g., speed limit of road being traversed by the vehicle). As another example, a hard-braking event may be a high-risk or unsafe driving event in which the vehicle decelerated at a rate greater than a maximum threshold deceleration rate. As yet another example, a hard-acceleration event may be a high-risk or unsafe driving event in which the vehicle accelerated at a rate greater than a maximum threshold acceleration rate. As still yet another example, a hard-turning event may be a high-risk or unsafe driving event in which the vehicle traveled at an angular rotational velocity greater than a maximum threshold angular rotational velocity. As another example, a swerving event may be a high-risk or unsafe driving event in which the vehicle performed two turns in quick succession. A tailgating event may be a high-risk or unsafe driving event in which the vehicle follows another vehicle too closely (e.g., is within a distance that is less than minimum distance from the other vehicle). A cutoff event may be a high-risk and unsafe driving event in which the vehicle changes lanes that would have resulted in a collision with another vehicle but for an evasive maneuver of the other vehicle.

In some instances, the minimum safe driving score threshold may be associated with a maximum number of high-risk or unsafe driving maneuvers that may be performed in a trip. If a minimum safe driving score is not reached (e.g., the driver's safe driving score is less than at least a minimum score threshold), the computing device may determine not to award the driver with safe driving currency and proceed to step 308. In response, the computing device may send, to the driver's client-side computing devices 100b for display to the driver, a notification that the driver is not being awarded safe driving currency because the driver performed too many high-risk or unsafe driving events. In some instances, the notification may also identify the number and types of high-risk or unsafe driving events (e.g., the driver performed 3 hard-braking events, tailgated another vehicle, etc.). In some instances, the notification may also include safe driving recommendations, which may be based on the type of high-risk or unsafe driving event performed by the driver. For example, if the driver speeds excessively, the notification may include a recommendation to follow the posted speed limit to have a better chance in obtaining safe driving currency.

Otherwise, if the driver's score is greater than or equal to the minimum score threshold, the computing device may, at step 306, determine to award the driver safe driving currency. The computing device may then determine how much safe driving currency to award the driver based on the driver's score with higher safe driving scores resulting in larger awards of safe driving currency and lower safe driving scores resulting in lower awards of safe driving currency. As an example, a driver score of 50 may result in 30 points of safe driving currency while a safe driving score of 100 may result in 60 points of safe driving currency. Because higher driver scores may result in larger awards of safe driving currency, which may then be used to purchase a desired benefit, the driver is incentivized to operate vehicle 209 is as safe a manner as possible. In one or more arrangements, the computing device or a database in communication with the computing device may store a table comprising each of the possible driver scores and a corresponding amount of safe driving currency to be awarded for those scores. Using the driver's score, the computing device may look up in the table the appropriate award of safe driving currency. In one or more alternative arrangements, the computing device may store an award formula that takes as input the safe driving score and outputs the appropriate award of safe driving currency.

In certain embodiments, computing devices 203, vehicle operation systems, client-side computing devices 100b and other data sources may transmit telematics data (e.g., vehicle operation data) for a vehicle 209 to the driving analysis server 220 in real-time (or near real-time). The application server 205 may be configured to receive the vehicle operation data, and then perform real-time (or near real-time) driving analyses, driver score calculations for the vehicle 209, and safe driving currency award calculations for the driver.

At step 308, a computing device (e.g., server-side computing devices 100a and/or application server 205) may determine whether a safe driving streak has been obtained. A safe driving streak may refer to a minimum preset number of successive trips a driver performed with a minimum preset score threshold for each of the trips. As an example, a driver may have to obtain a driver score of 50 for each trip of seven successive trips to satisfy a safe driving streak. After each trip, the driver's score and a trip identifier may be stored in a log for the driver at the computing device (see step 316) for use with determining safe driving streaks. If the driver satisfies the safe driving streak, the computing device may, at step 310, award the driver a bonus of safe driving currency, which may be in addition to the safe driving currency awarded for the current trip. The amount of the bonus may vary based on one more of the driver's average driver score over the trips, the driver's lowest driving score over the trips, the driver's highest driving score over the trips, the duration of the trips, and/or the length of the streak. By providing a bonus for obtaining a streak of safe driving trips, the driver is further motivated to drive safely each time the driver operates vehicle 209. Otherwise, if the driver did not obtain a safe driving streak (e.g., the driver did not obtain a driver score of 50 for each trip of his or her last 7 trips), the computing device might not award the driver a bonus of safe driving currency and the method may proceed to step 312.

At step 312, a computing device (e.g., server-side computing devices 100a and/or application server 205) may determine whether a stamp booklet has been filled. A stamp booklet may indicate a minimum number of trips a driver performed with a minimum preset score threshold for each trip. That is, for each trip the driver performs with minimum score threshold, the driver may obtain a stamp. Once the stamp booklet is "filled" with a preset number of stamps, the computing device may, in step 314, award the driver with yet another bonus of safe driving currency, which may be in addition to the safe driving currency awarded for the current trip and the bonus of safe driving currency for obtaining a safe driving streak. The stamp booklet differs from the safe driving streak in that the stamp booklet may be filled by trips that are not in temporally successive order. For instance, there may be a trip temporally in between the first trip and last trip used in the stamp booklet in which the driver might not have obtained the minimum driver score. In the safe driving streak, such a trip would reset the streak. The driver's stamp booklet may be stored in the driver's log.

As with the safe driving screak, the amount of the bonus may vary based on one more of the driver's average driver score over the trips, the driver's lowest driving score over the trips, the driver's highest driving score over the trips, the duration of the trips, and/or the number of trips to fill the stamp booklet. By providing a bonus for filling the stamp booklet, the driver is further motivated to drive safely each time the driver operates vehicle 209. If the driver did not fill the stamp booklet, the computing device might not award the driver a bonus of safe driving currency and the method may proceed to step 316.

At step 316, a computing device (e.g., server-side computing devices 100a and/or application server 205) may update the driver's safe driving currency account and the driver's log, which are each stored at the computing device. For instance, each award of safe driving currency may be added to the balance of the driver's safe driving currency account. For instance, if the driver has 50 points of safe driving currency already in the driver's account obtained from a previous trip and the driver obtained 25 points of safe driving currency in the current trip, the driver's account may now have 75 points of safe driving currency. Additionally, the computing device may update the driver's safe driving streak information and stamp booklet in the driver's log. For instance, if for the current trip, the driver obtained a driver score below a minimum score threshold, the driver's safe driving streak may be reset to zero. Otherwise, if the driver's score is greater than or equal to the minimum score threshold, the driver's safe driving streak may be incremented by one and a stamp may be added to the driver's stamp booklet. However, if the driver received a bonus of safe driving currency for obtaining a safe driving streak, the driver's safe driving streak may be reset to zero. Similarly, if the driver received a bonus of safe driving currency for filling the stamp booklet, the driver's each of the stamps in the driver's stamp booklet may be removed and/or otherwise reset to zero. Once updated, the driver's updated balance and log may be sent to the driver's client-side computing device 100b. The driver's client-side computing device 100b may then display a notification of which types of awards were obtained, the amount of safe driving currency for each award, current balance of safe driving currency, and/or updated log information (e.g., streak information such as streak count, stamp booklet information such as stamp count, etc.).

Figure 4:
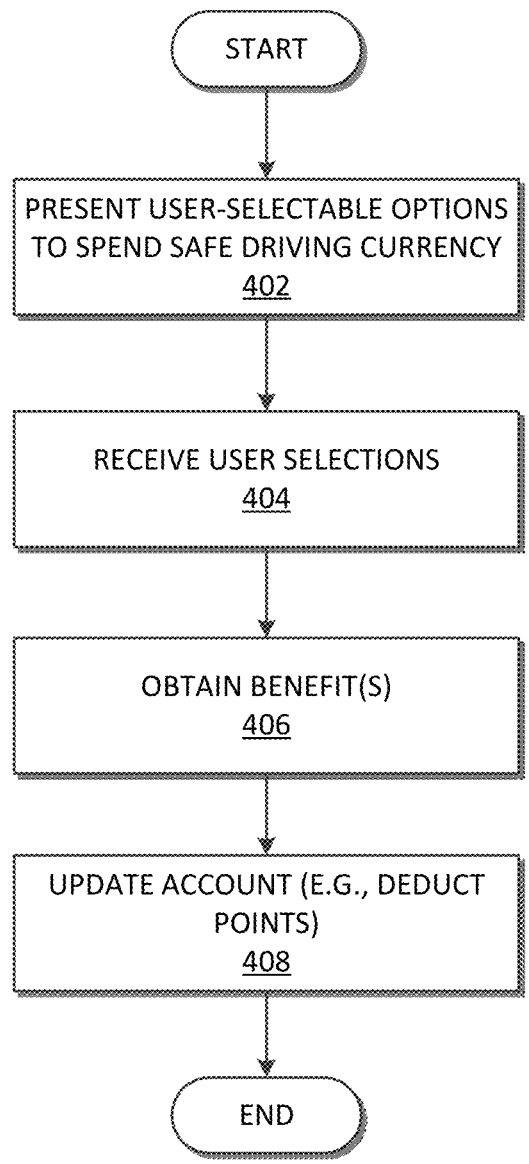
FIG. 4 depicts an illustrative flow diagram for an example method of obtaining a benefit in exchange for safe driving currency, according to one or more aspects of the disclosure.

FIG. 4 depicts an illustrative flow diagram for an example method of obtaining a benefit in exchange for safe driving currency, according to one or more aspect of the disclosure. The method of FIG. 4 and/or one or more steps thereof may be performed by a computing device (e.g., client-side computing device 100b). The method illustrated in FIG. 4 and/or one or more steps thereof may be partially or fully embodied, for example, in computer-executable instructions that are stored in a computer-readable medium, such as a non-transitory computer-readable memory. In some instances, one or more steps of FIG. 4 may be performed in a different order and/or combined. In some instances, one or more steps of FIG. 4 may be omitted and/or otherwise not performed.

Figure 10:
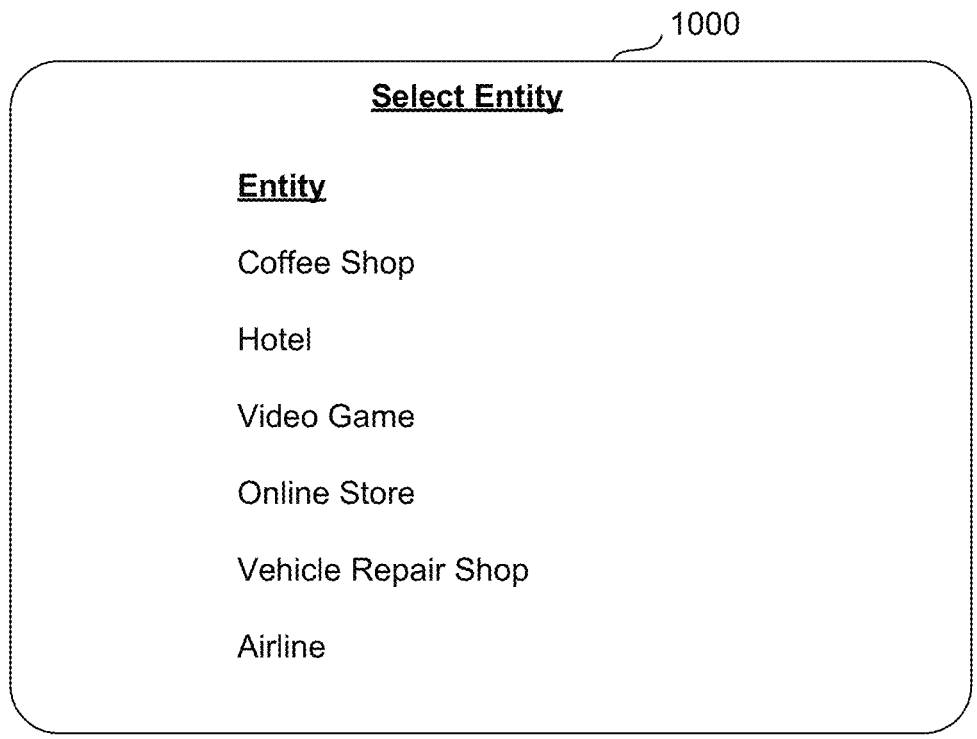
FIGS. 10-11 depict illustrative user interfaces, according to one or more aspects of the disclosure.
Figure 11:
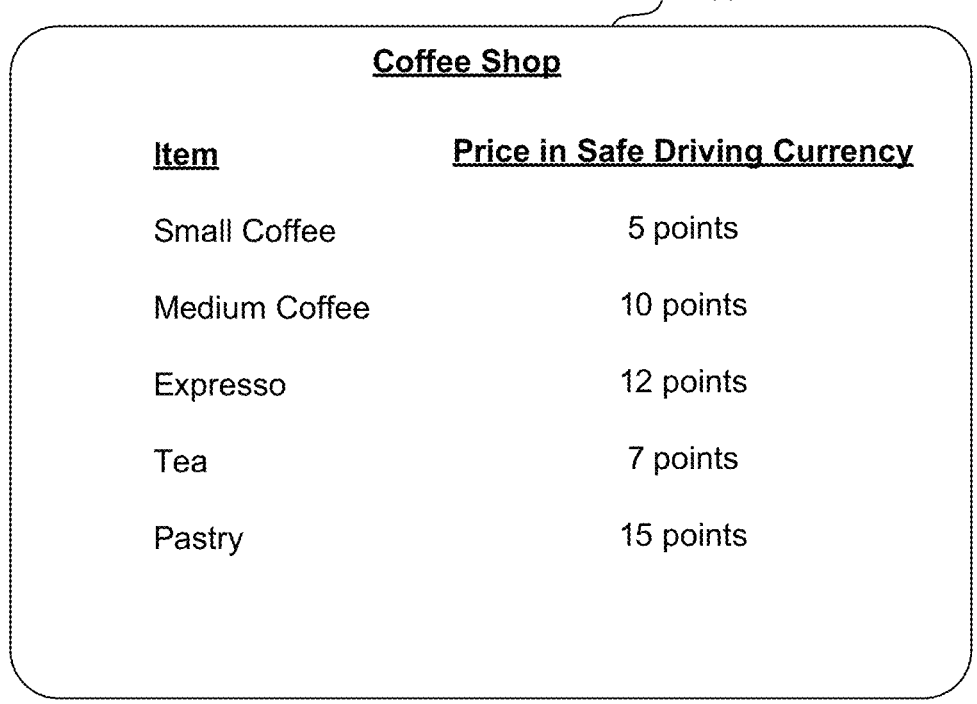

As shown in FIG. 4, the method may begin at step 402 in which a computing device (e.g., client-side computing device 100b) may present user-selectable options to spend safe driving currency. For example, server-side computing devices 100a and/or application server 205 may provide a file including data to render information in the various interfaces and the selectable options to the client-side computing device 100b for display to the driver. Each user interface may include multiple objects that may be selected e.g., via touch input. A first user interface may include a scrollable list of the names of the third-party entities (e.g., a coffee shop, a hotel, a video game provider, a vehicle repair shop, an online store, a restaurant, etc.) at which the driver may purchase a reward or benefit using the driver's safe driving currency. FIG. 10 depicts an illustrative user interface 1000, which may be an example of a first user interface. Upon selection of one of the third-party entities by the driver at step 404, a second user interface may be displayed. The second user interface may include a scrollable list of benefits (e.g., goods and/or services) the driver may purchase from the selected third-party entity for a particular amount of safe driving currency, which may also be included in the list of goods and/or services. Benefits may include hotel status, airline status, electronic game status (e.g., a cape indicative of game status), electronic game points or currency, electronic game items (e.g., an electronic hammer for use in the electronic game), coffee items, vehicle maintenance or repair services (e.g., oil change), or any other good or service provided by a third party entity the entity wishes to make available for purchase using safe driving currency. FIG. 11 depicts an illustrative user interface 1100, which may be an example of a second user interface. If the user wishes to view the purchasable benefits of another entity, the driver may select an icon to return to the first user interface to select and view another third party entity's purchasable benefits. Further, one or more of the user interfaces may include the third-party hours of operation, contact information (e.g., a telephone number, website, etc.), location information, and/or customer reviews.

At step 406, the driver may select and obtain a benefit. As an example, while the driver is in the second user interface for an online store, the driver may order a good to be shipped to the driver (e.g., the driver's home or business). The driver may purchase the good using the driver's safe driving currency. As another example, the driver may, while at a coffee shop, purchase a coffee item using the driver's safe driving currency. As yet another example, the driver may purchase an oil change using the driver safe driving currency while the driver is at a vehicle maintenance shop. As yet another example, the driver may purchase an electronic in-game item for a particular electronic game from the electronic game's provider. The video game provider may update the driver's game profile to include the electronic in-game item so that the next time the driver plays the electronic game, the driver may access the purchased electronic in-game item.

Additionally, in some instances, transactions involving safe driving currency may be performed in a similar manner as transactions involving actual currency. For instance, the driver may obtain a receipt for the purchase and the third-party entity may record the transaction in its transaction log.

As shown in some of the above examples, in order to purchase some items using the driver's safe driving currency, the driver may be at the third party entity's location (e.g., in order to purchase a coffee item, the driver may be at the coffee shop's location). Additionally, in such examples, the driver's client-side computing device 100b may communicate with a system of the third-party entity such as the third-party entity's cash register in order to effectuate the transaction. In some examples, the client-side computing device 100b may include near-field communication (NFC) and/or another wireless access protocol to communicate with the cash register to perform the transaction. In other examples, the client-side computing device 100b may display a quick-response (QR) code for the cash register to scan to perform the transaction.

At step 408, the driver's client-side computing device 100b may update the driver's safe driving currency account by deducting the amount of the purchase from the safe driving account. For example, if the driver's safe driving currency account has 100 points and the amount of the purchase was 20 points, then the driver's client-side computing device 100b may reduce the driver's safe driving currency account by 20 points leaving 80 points left in the account. The driver's client-side computing device 100b may then transmit the updated account information to the server-side computing devices 100a and/or the application server 205 so that they may update the driver's safe driving currency account in their records.

Figure 5:
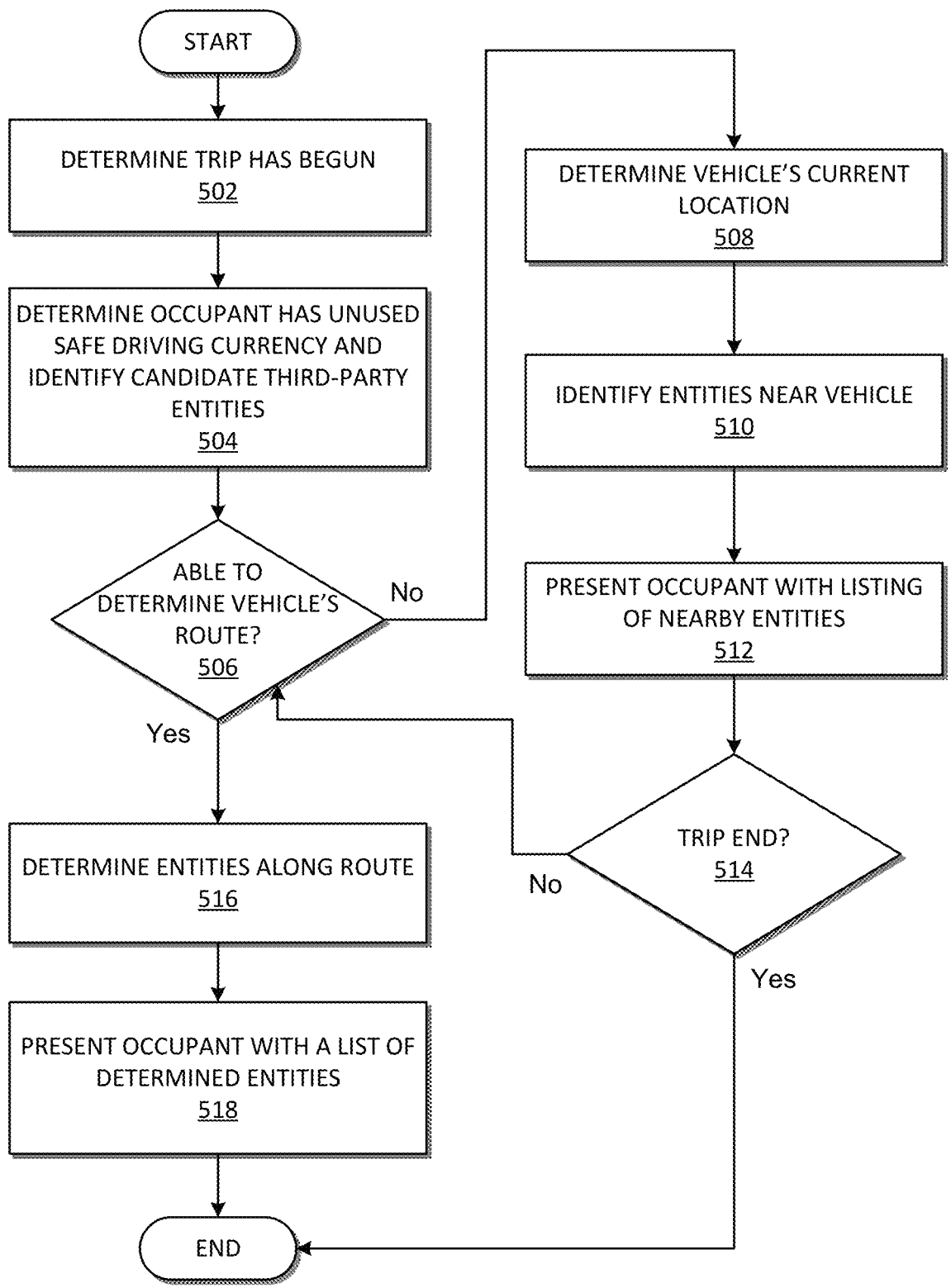
FIG. 5 depicts an illustrative flow diagram for an example method of dynamically providing a driver or passenger with locations of third-party entities along the driver's route at which the driver may spend safe driving currency, according to one or more aspects of the disclosure.

FIG. 5 depicts an illustrative flow diagram for an example method of dynamically providing a driver or passenger with locations of third-party entities along the driver's route at which the driver may spend safe driving currency, according to one or more aspects of the disclosure. In some cases, a driver or passenger may begin a trip along a particular route (e.g., traveling to work, school, or another entity). In such cases, while the driver or passenger is traversing the route, the driver's or passenger's client-side computing device 100b may notify the driver or passenger of one or more third-party entities that are geographically located along the route, where the driver or passenger may purchase a benefit from the third-party entity using safe driving currency. The method of FIG. 5 and/or one or more steps thereof may be performed by a computing device (e.g., client-side computing device 100b). The method illustrated in FIG. 5 and/or one or more steps thereof may be partially or fully embodied, for example, in computer-executable instructions that are stored in a computer-readable medium, such as a non-transitory computer-readable memory. In some instances, one or more steps of FIG. 5 may be performed in a different order and/or combined. In some instances, one or more steps of FIG. 5 may be omitted and/or otherwise not performed. Driver and passenger may collectively be referred to herein as an occupant of the vehicle.

As shown in FIG. 5, the method may begin at step 502 in which a computing device (e.g., client-side computing device 100b) may determine whether a trip has begun. The client-side computing device 100b may detect that a trip has begun in response to determining that client-side computing devices 100b is moving beyond a preset minimum speed (e.g., 20 mph) for at least a preset minimum duration (e.g., 2 minutes). Additionally, client-side computing device 100b may determine that a trip has begun in response to receiving occupant input indicating that a trip has begun (e.g., activation of a navigation application installed on the client-side computing device 100b, activation of a safe driving application installed on the client-side computing device 100b, selection of start trip icon in the safe driving application, etc.). In some instances, the client-side computing device 100b may inform the server-side computing device 100a or application server 205 that a trip has begun.

Additionally, at step 504, the server-side computing device 100a, application server 205, and/or the occupant's client-side computing device 100b may determine an amount of unused safe driving currency currently available in the occupant's safe driving currency account. Previously, the occupant's client-side computing device 100b may have received the file discussed above in step 402. That is, the occupant's client-side computing device 100b may have received data to render information in the various interfaces and the selectable options to the client-side computing device 100b for display to the driver. For instance, for each third-party entity, the occupant's client-side computing device 100b may also have received the listing of available benefits, their corresponding costs in terms of safe driving currency, and their location information. The server-side computing device 100a, the application server 205, and/or the client-side computing device 100b may identify one or more candidate third-party entities for which the occupant has sufficient safe driving currency to purchase at least one benefit from the third-party entity. If the occupant does not have sufficient safe driving currency to purchase a benefit from a third-party entity, that third-party entity might not be considered a candidate third-party entity. If there are no candidate third-party entities, the method may end. However, if there is at least one candidate third-party entity, the method may continue to step 506.

At step 506, the server-side computing device 100a, the application server 205, and/or the occupant's client-side computing device 100b may attempt to determine a route to be traversed by the occupant's vehicle 209. A route may include one or more streets to be traversed in a particular sequential order by vehicle 209. As an example, a route to be traversed by vehicle 209 may include a particular segment of street A in a particular direction, followed by a particular segment of street B in a particular direction, and so on. A segment of a street may be specified by two geographic locations (e.g., two sets of GPS longitude and latitude coordinates), by two end markers (e.g., two bounding cross-streets that intersect the street), etc.

The server-side computing device 100a, the application server 205, and/or the occupant's client-side computing device 100b may attempt to predict and/or otherwise determine the vehicle's route. In some instances, the occupant may specify the route by entering the route into the safe driving application installed on the client-side computing device 100b. In other instances, the client-side computing device 100b may request route information from either a local vehicle navigation application installed on client-side computing device 100b or from a remove vehicle navigation system (e.g., the vehicle's 209 navigation system). In yet other instances, the server-side computing device 100a, the application server 205, and/or the client-side computing device 100b may record routes of previous trips and the time at which the trips occurred and store such information in a habit database. The server-side computing device 100a, the application server 205, and/or the client-side computing device 100b may then determine time at which the current trip is occurring and a current location of vehicle 209 and use this information to determine whether the time and location of the vehicle match a location on a recorded route at a similar time of day (e.g., within a preset timeframe). As an example, the client-side computing device 100b may determine that the occupant travels to work every morning around 8:00 am along a particular route. During the current trip, if the vehicle is at a location along the particular route and the trip is occurring near 8:00 am, the client-side computing device 100b may determine that the particular route is the route for the current trip. If either the vehicle is not at a location along the route or the trip is not occurring near 8:00 am, the client-side computing device 100b may determine that the particular route is not the route for this trip.

If the client-side computing device 100b is able to predict and/or otherwise determine a route for the current trip, the method may proceed to step 516. Otherwise, if the client-side computing device 100b is not able to predict and/or otherwise determine a route for the current trip, the method may proceed to step 508.

As discussed above, in some instances, the occupant's client-side computing device 100b may work in tandem with one or more of the server-side computing device 100a and the application server 205. Thus, in some cases, the occupant's client-side computing device 100b may provide the server-side computing device 100a and/or the application server 205 one or more of its location information, predicted route information, user route selection information, trip log information, and the like.

At step 508, the client-side computing device 100b may update the vehicle's location using, for example, the GPS system of the client-side computing device 100b. In some instances, the updated location information may be sent to the server-side computing device 100a and/or the application server 205.

At step 510, the server-side computing device 100a, the application server 205, and/or the client-side computing device 100b may identify third-party candidate entities that are near (e.g., within an occupant-selected or otherwise determined distance of) the vehicle 209. The occupant may select using the safe driving application a distance from the vehicle's current location within which to identify candidate third-party entities. As an example, the occupant may select a 5-mile distance. The client-side computing device 100b may identify each candidate third-party entity within a 5 mile radius of the location of vehicle 209. In some instances, may transmit, to the client-side computing device 100b, a list of identified candidate third-party entities, days and times when they are open, items for sale, and/or cost of the items for sale.

At step 512, the client-side computing device 100b may present the occupant with a listing of the identified candidate third-party entities. For instance, the client-side computing device 100b may display a map including the current location of vehicle 209 and the locations of the candidate third-party entities near (e.g., with the occupant-selected distance) its current location. In some instances, selection of a third-party candidate may display a list of available benefits for purchase and/or activate a navigational application installed on the client-side computing device 100b and begin navigating to the selected candidate third-party entity.

At step 514, the client-side computing device 100b may determine whether the trip has ended. For example, the client-side computing device 100b may determine that the trip has ended when the vehicle 209 has been shut off or stopped for at least a minimum time period. In some instances, the client-side computing device 100b may inform the server-side computing device 100a and/or the application server 205 that the trip has ended. If the trip has ended, the method may end. Otherwise, if the trip has not ended, the method may return to step 506 where the server-side computing device 100a, the application server 205, and/or the client-side computing device 100b may again attempt to predict the route. If it is unable to do so, the method may again repeat steps 508-514. As a result, in the event that the server-side computing device 100a, the application server 205, and/or the client-side computing device 100b is repeatedly unable to determine the route, the occupant may be presented with a periodically updated listing of candidate third-party entities that are with the user-specified distance of vehicle 209.

If, in step 506, one of the server-side computing device 100a, the application server 205, and/or the client-side computing device 100b predicts a route of vehicle 209, then, in step 516, the server-side computing device 100a, the application server 205, and/or the client-side computing device 100b may determine candidate third-party entities that are within a user-specified distance of a portion of the route. For instance, the occupant may select using the safe driving application a distance from the route within which to identify candidate third-party entities. For instance, if the user selects a 1-mile distance, then the client-side computing device 100b may determine candidate third-party entities that are located within 1-mile at least one point of the route. In some instances, the server-side computing device 100a and/or the application server 205 may transmit a list of the identified candidate third-party entities to the client-side computing device 100b.

At step 518, the client-side computing device 100b may present the occupant with a list of the determined candidate third-party entities. In some instances, the client-side computing device 100b may display a map including the current location of vehicle 209 and the locations of the candidate third-party entities near its route. In some instances, selection of a third-party candidate may display a list of available benefits for purchase and/or activate a navigational application installed on the client-side computing device 100b and begin navigating to the selected candidate third-party entity.

In one or more arrangements, the candidate third-party entities presented to the occupant in the list may be filtered based on the days and hours the candidate third-party entities are open for business. In some instances, if a candidate third-party entity is currently closed, the client-side computing device 100b may remove the candidate third party entity from the list presented to the occupant.

Figure 6:
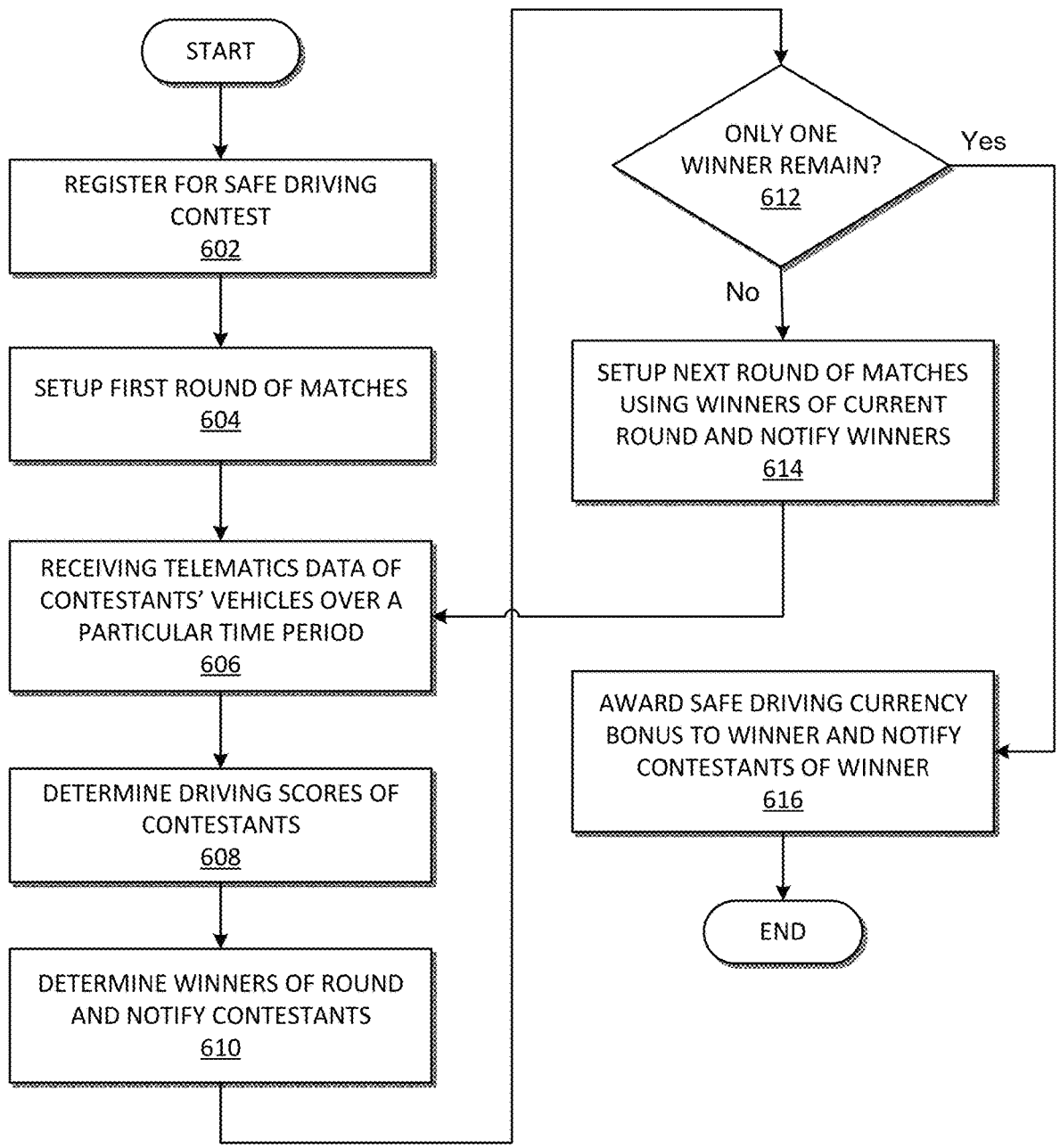
FIG. 6 depicts an illustrative flow diagram for an example method of providing safe driving contests to determine the safest driver or group of safest drivers, according to one or more aspects of the disclosure.

FIG. 6 depicts an illustrative flow diagram for an example method of providing safe driving contests to determine the safest driver or group of safest drivers, according to one or more aspect of the disclosure. In some cases, a driver or group of drivers (e.g., a school, a company, or other organization whose members may operate vehicles) may compete against one another in a safe driving tournament to see who can obtain the highest driving scores in a series of matches. The winner of the tournament may be awarded a safe driving currency bonus for use in purchasing a benefit from a third-party entity or for a reduction in an insurance premium. The method of FIG. 6 and/or one or more steps thereof may be performed by a computing device (e.g., server-side computing devices 100a and/or application server 205). The method illustrated in FIG. 6 and/or one or more steps thereof may be partially or fully embodied, for example, in computer-executable instructions that are stored in a computer-readable medium, such as a non-transitory computer-readable memory. In some instances, one or more steps of FIG. 6 may be performed in a different order and/or combined. In some instances, one or more steps of FIG. 6 may be omitted and/or otherwise not performed.

As shown in FIG. 6, the method may begin at step 602 in which multiple contestants may register with a computing device (e.g., server-side computing devices 100a and/or application server 205) to compete in a safe driving contest. In one instance, one or more persons may register to compete against one another in a safe driving knockout tournament. In another instance, one or more organizations may register to compete against one another in a safe driving knockout tournament. The contestants may register via a web-based portal provided by server-side computing devices 100a and/or application server 205.

At step 604, a computing device (e.g., server-side computing devices 100a and/or application server 205) may setup a first round of matches. For instance, each contestant may be matched to compete with one other contestant. The computing device may send a notification to each contestant of their opponent and a particular time period during which they will compete against one another.

At step 606, a computing device (e.g., server-side computing devices 100a and/or application server 205) may receive telematics data from each contestant for the particular time period. In some instances, the telematics data may be received in real-time (or near real-time) from the contestant's computing device 203 of vehicle 209 or from client-side computing device 100b. In other instances, the telematics data may be recorded by the contestant's computing device 203 of vehicle 209 or client-side computing device 100b for the particular time period, and may be transmitted to the server-side computing devices 100a and/or application server 205 at the end of the time period.

At step 608, the computing device may determine a safe driving score for each contestant in a similar manner as discussed above in FIG. 3. The higher the safe driving score for a contestant, the fewer high-risk or unsafe driving events were performed by the contestant during the time period. The computing device may identify high-risk or unsafe events performed by the vehicle from the telematics data, for example, by comparing values of the telematics data with preset dynamic thresholds, or combinations of thresholds. The preset thresholds may be dynamically adjusted based on weather and road conditions present during the driver's trip, which may be retrieved by the computing device from a weather providing service. The driver score may account for numerous other high-risk or unsafe driving events, which may negatively affect (e.g., reduce) the driver score. As an example, an excessive speeding event may be a high-risk or unsafe driving event in which the vehicle's speed or velocity is greater than a maximum speed threshold (e.g., speed limit of road being traversed by the vehicle).

Additionally, the driver score may account for the length of time the contestant operated a vehicle during the time period. For instance, in order to receive a safe driving score, a contestant may have to operate a vehicle for at least a minimum duration of time during the time period.

At step 610, the computing device may determine the winners of the round and notify the contestants of the results. For instance, for each contestant matchup, the computing device may determine which of the two contestants in the matchup received a higher driver score and identify that contestant as the winner of the matchup. The notification may be sent to the contestant's client-side computing device 100b for display or may be accessible via a web-based portal. The notification may indicate who won and the driver scores of each contestant.

At step 612, the computing device may determine if only one winner remains. If so, the method may proceed to step 616 where the computing device may award a bonus of safe driving currency to the winner of the safe driver knockout tournament. Additionally, the computing device may send a message to each contestant's client-side computing device 100b notifying the contestant who won the safe driver knockout tournament. Otherwise, if, in step 612, the computing device determines that the more than one winner remains, the computing device may, in step 614, setup the next round of matches using the winners of the current round and notify the winners of their next opponent and next time period during which they will be competing. The method may then continue to repeat step 606-614 until only one winner remains.

Figure 7:
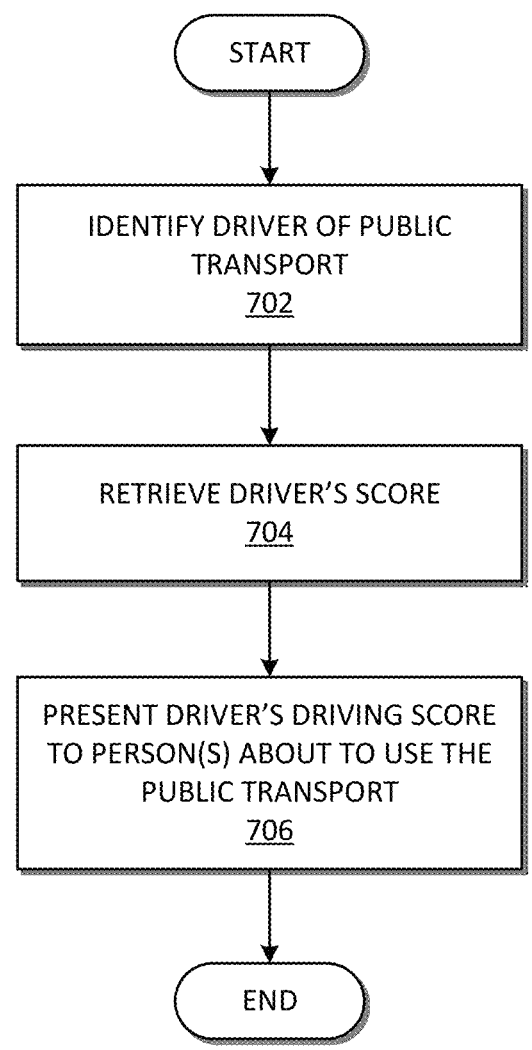
FIG. 7 depicts an illustrative flow diagram for an example method of providing a safe driving score to potential customers of persons engaged in ride-for-hire services, according to one or more aspects of the disclosure.

FIG. 7 depicts an illustrative flow diagram for an example method of providing a safe driving score of a driver engaged in a ride-for-hire service to potential customers of the driver engaged in ride-for-hire services, according to one or more aspect of the disclosure. In some cases, a person may wish to use a taxicab or a ride-sharing service to be transported from one place to another. In such cases, the person may wish to know how safe the driver operates the vehicle before agreeing to become the driver's customer. The method of FIG. 7 and/or one or more steps thereof may be performed by a computing device (e.g., client-side computing devices 100b). The method illustrated in FIG. 7 and/or one or more steps thereof may be partially or fully embodied, for example, in computer-executable instructions that are stored in a computer-readable medium, such as a non-transitory computer-readable memory.

As shown in FIG. 7, the method may begin at step 702 in which the person's computing device (e.g., client-side computing device 100b) may identify a driver of a public transport. The public transport may be a taxicab, a ride-sharing vehicle, a bus, or any other public transport. In some instances, the driver may be identified from a ride sharing app installed on the person's client-side computing device 100b. In other instances, the person may enter the driver's identification information into the client-side computing device 100b or scan the driver's identification badge posted in the vehicle using the camera of the client-side computing device 100b.

At step 704, the client-side computing device 100b may retrieve the driver's safe driving score from the server-side computing devices 100a and/or application server 205. The server-side computing devices 100a may receive telematics data of the driver as he transports customers. After transporting each customer, the server-side computing devices 100a may compute and/or update the driver's safe driving score. The client-side computing device 100b may transmit a request including the driver identification information. In response, the client-side computing device 100b may receive the driver's safe driving score.

At step 706, the client-side computing device 100b may present and/or otherwise display the safe driver score of the driver to the person so he or she may consider the driver's safe driving score in deciding whether to allow the driver to transport him or her. In some arrangements, the driving score of this particular driver may be displayed with driving scores of other drivers, or displayed on a scale, to indicate to the potential customer how safely the driver operates a vehicle as compared to other drivers engaged in similar ride-for-hire services.

In one or more embodiments, an insurance provider may wish to use gaming behavior in its determination of an insurance premium as it may be predictive of how likely a driver will engage in high-risk or unsafe driving behavior. In such embodiments, servers 211 may represent a server of electronic game providers. Gaming behavior may refer to gaming patterns derived from gaming data of a driver. Gaming behavior may include the driver's ability to obtain a particular score in a particular game or particular game type. Gaming behavior may include the driver's ability to cause one or more events to occur in a particular game (e.g., car crashes during a race in a racing video game) or particular game type.

Figure 8:
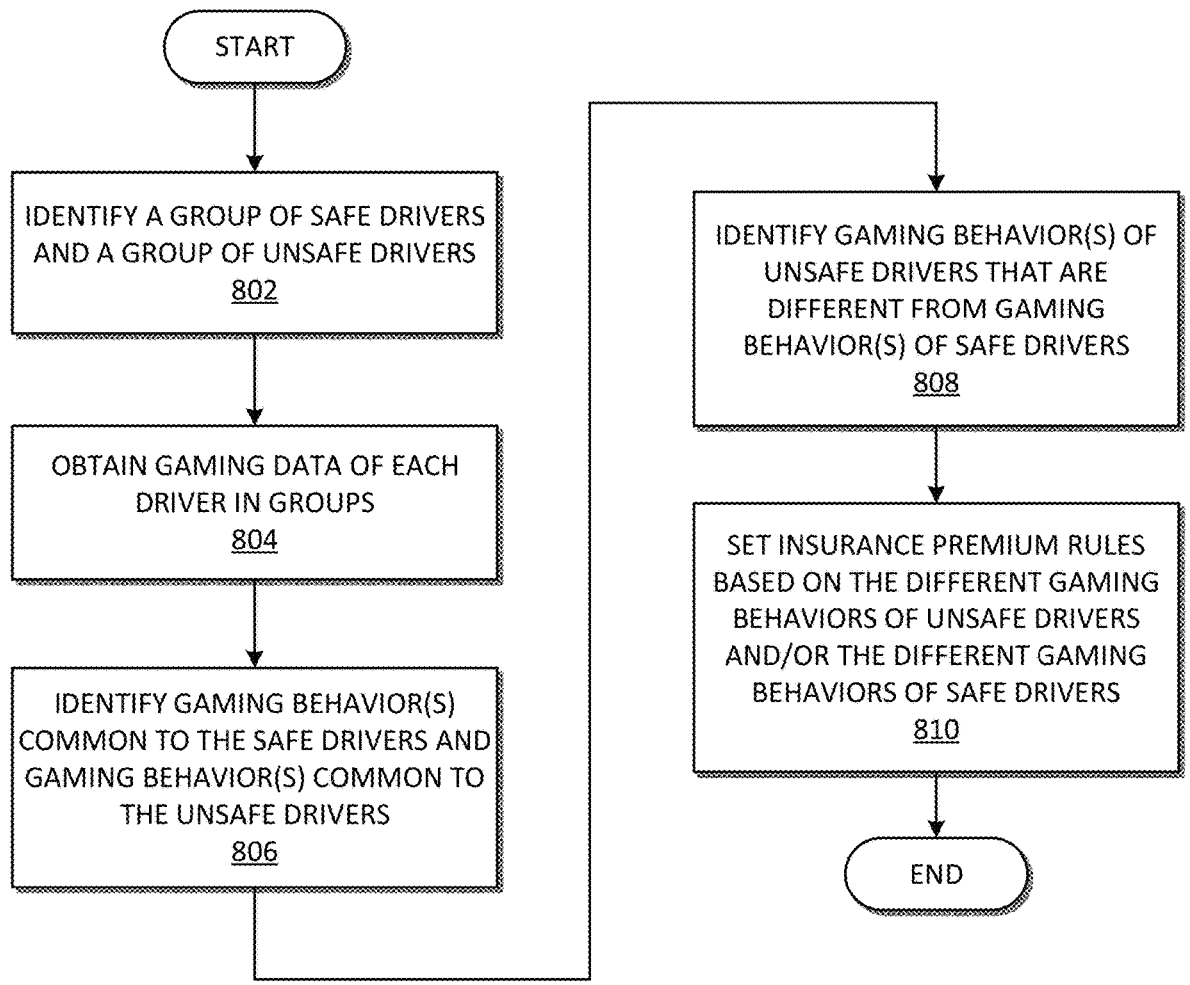
FIG. 8 depicts an illustrative flow diagram for an example method of generating rules to set insurance premiums based on gaming behavior, according to one or more aspects of the disclosure.

FIG. 8 depicts an illustrative flow diagram for an example method of generating rules to set insurance premiums based on gaming behavior, according to one or more aspect of the disclosure. The method of FIG. 8 and/or one or more steps thereof may be performed by a computing device (e.g., server-side computing devices 100a and/or application server 205). The method illustrated in FIG. 8 and/or one or more steps thereof may be partially or fully embodied, for example, in computer-executable instructions that are stored in a computer-readable medium, such as a non-transitory computer-readable memory. In some instances, one or more steps of FIG. 8 may be performed in a different order and/or combined. In some instances, one or more steps of FIG. 8 may be omitted and/or otherwise not performed.

As shown in FIG. 8, the method may begin at step 802 in which a computing device (e.g., server-side computing devices 100a and/or application server 205) may identify a group of safe drivers (e.g., drivers who have an average safe driving score greater than or equal to a minimum score threshold) and a group of unsafe drivers (e.g., drivers who have an average safe driving score that is less than the minimum score threshold). The drivers may be customers of a particular insurance provider associated with server-side computing devices 100a and/or application server 205.

At step 804, the computing device may obtain gaming data of each driver in each of the groups. For instance, the computing device may send an instruction to instruct the servers 211 to collect and record gaming statistics of the drivers in the groups and send the gaming statistics to the computing device for analysis. The servers 211 may record the gaming statistics for a preset time period specified in the instruction. As noted above, the servers 211 may be servers of electronic gaming providers, which may include, for example, personal computer (PC) gaming providers, console gaming providers, video game manufacturers, etc.

At step 806, the computing device may analyze the gaming statistics of the drivers to identify gaming behaviors (e.g., patterns) common to the safe drivers and gaming behaviors (e.g., patterns) common to the unsafe drivers. As an example, the computing device may determine that the safe drivers are frequently able to (or, alternatively, unable to) obtain a particular score in a particular video game or a particular type of video game. Different types of video games may include, for example, vehicle-racing video games, first-person shooter video games, action and adventure video games, fighting video games, sports video games, strategy video games, puzzle video games, role-playing video games, fitness video games, simulation video games (e.g., pilot simulation video games), and the like. As another example, the computing device may determine that the safe drivers frequently have the same particular ability in a particular video game or a particular type of video game. For instance, in a vehicle-racing type of video game, the computing device may determine that the safe drivers usually crash less than two times during a race. Similarly, the computing device may determine that the unsafe drivers are frequently able to (or, alternatively, unable to) obtain a particular score in a particular video game or a particular type of video game. Additionally, the computing device may determine that the unsafe drivers frequently have the same particular ability in a particular video game or a particular type of video game. For instance, in a vehicle-racing type of video game, the computing device may determine that the unsafe drivers usually crash more than three times during a race.

In determining gaming behaviors for the group of safe drivers and the gaming behaviors of the group of unsafe drivers, the computing device might ignore outliers. For instance, in a vehicle-racing type of video game, the computing device may determine that most (e.g., at least a minimum preset percentage) of the safe drivers usually crash less than two times during a race. However, one of the safe drivers may have crashed five times during a race and may be identified by the computing device as an outlier and, as a result, may ignore the outlier in determining that most of the safe usually crash less than two times during a race.

At step 808, the computing device may identify the gaming behaviors of unsafe drivers that are different from the gaming behaviors of safe drivers, and vice-versa. As an example, the computing device may determine that the safe drivers tend to be better drivers than the unsafe drivers in a vehicle-racing video game since the safe drivers may crash less frequently during a race than the unsafe drivers. For instance, the safe drivers may on average crash less than two times during a race while the unsafe driver may on average crash three or more times during a race. As another example, the computing device may determine that the unsafe drivers tend to receive higher scores than the unsafe drivers in first-person shooter games.

At step 810, the computing device may set one or more insurance premium rules based on the gaming behaviors of unsafe drivers that are different from the safe drivers, and vice-versa. The computing device may define rules having parameters that if met raise or lower an insurance premium. In some instances, the parameters may be in the form of threshold score values in a particular video game or type of video game. The threshold score values may be determined based on the gaming behavior of safe drivers and/or the gaming behavior of unsafe drivers. If safe drivers tend to have at least some minimum score in a particular game or type of game above and unsafe drivers tend to have a lower score than the minimum score (or vice-versa), then the computing device may set the minimum score as a threshold. As an example, if the safe drivers tend to obtain a score of at least 50 points in a particular game and the unsafe drivers tend to obtain a score of less than 50 points, then 50 points may be set as a threshold for a rule associated with that video game. In this instance, the rule may be that a person who receives at least 50 points in that particular video game, then the person's insurance premium determination may be positively affected resulting in a reduced insurance premium.

Otherwise, if the person receives less than 50 points in that particular video game, then the person's insurance premium determination may be negatively affected resulting in an increased insurance premium. As another example, if the unsafe drivers tend to obtain a score of at least 100 points in a different particular game and the safe drivers tend to obtain a score of less than 100 points, then 100 points may be set as a threshold for a rule associated with that video game. In this instance, the rule may be that a person who receives at least 100 points in that particular video game, then the person's insurance premium determination may be negatively affected resulting in an increased insurance premium. Otherwise, if the person receives less than 100 points in that particular video game, then the person's insurance premium determination may be positively affected resulting in a decreased insurance premium.

In some instances, the parameters may be in the form of threshold event values in a particular video game or type of video game. The threshold score values may be determined based on the gaming behavior of safe drivers and/or the gaming behavior of unsafe drivers. If safe drivers tend to have at least some minimum number of events that occur in a particular video game or a particular type of video game and unsafe drivers tend to have a lower number of event occur in the same particular video game or particular type of video game (or vice-versa), then the computing device may set the minimum number of events as a threshold. An event may be any type of action that may occur in a video game or type of video game as a result an action by a person playing the video game or type of video game. As an example, an event may be a number of accidents or crashes during a race in a vehicle-racing game. As another example, an event may be a number of hits in a first-person shooter combat game. As an example, if the safe drivers tend to cause three or less crashes in a vehicle-racing video game and the unsafe drivers tend to cause four or more crashes in the vehicle-racing video game, then three crashes may be set as a threshold for a rule associated with that vehicle-racing video game. In this instance, the rule may be that a person who causes three or less in that particular video game, then the person's insurance premium determination may be positively affected resulting in a reduced insurance premium. Otherwise, if the person causes more than three crashes in that particular video game, then the person's insurance premium determination may be negatively affected resulting in an increased insurance premium.

Using the rules, a person with gaming behavior that correlates with the gaming behavior of the safe drivers may receive a lower insurance premium. Similarly, using the rules, a different person with gaming behavior that correlates with the gaming behavior of the unsafe drivers may receive a higher insurance premium.

Figure 9:
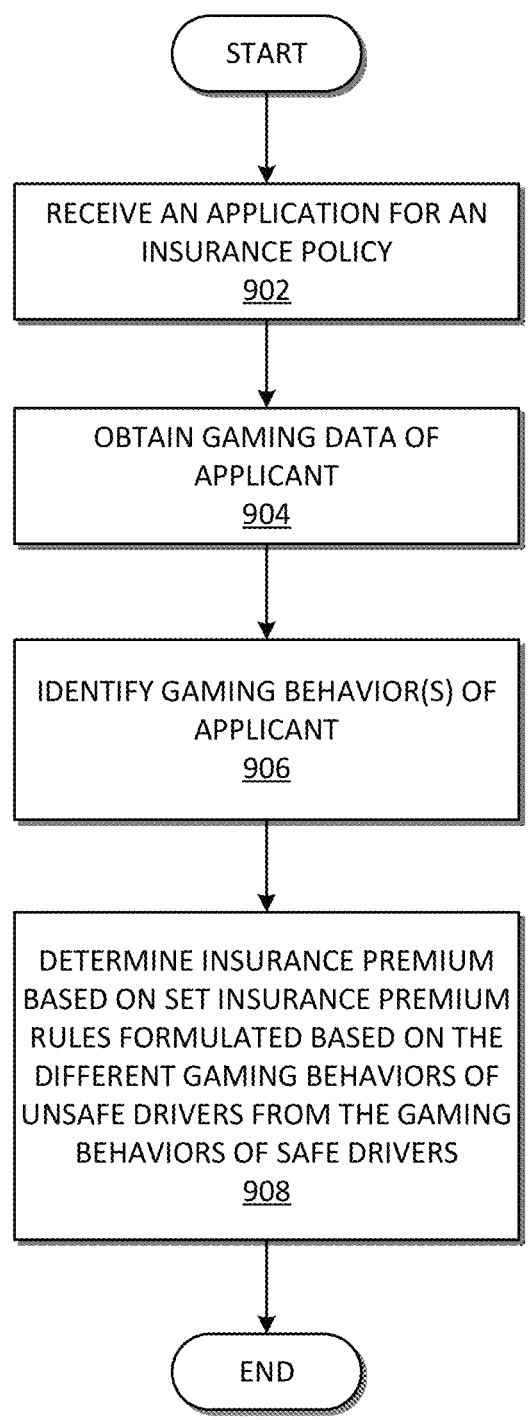
FIG. 9 depicts an illustrative flow diagram for an example method of determining an insurance premium based on gaming behavior, according to one or more aspects of the disclosure.

FIG. 9 depicts an illustrative flow diagram for an example method of determining an insurance premium based on gaming behavior, according to one or more aspect of the disclosure. The method of FIG. 9 and/or one or more steps thereof may be performed by a computing device (e.g., server-side computing devices 100a and/or application server 205). The method illustrated in FIG. 9 and/or one or more steps thereof may be partially or fully embodied, for example, in computer-executable instructions that are stored in a computer-readable medium, such as a non-transitory computer-readable memory. In some instances, one or more steps of FIG. 9 may be performed in a different order and/or combined. In some instances, one or more steps of FIG. 9 may be omitted and/or otherwise not performed.

As shown in FIG. 9, the method may begin at step 902 in which a computing device (e.g., server-side computing devices 100a and/or application server 205) may receive an application for an insurance policy from an applicant. The application may be received via a web-based portal, insurance agent, etc. The application may include information about the applicant including name, credit history, medical history, accident history, etc.

At step 904, the computing device may obtain gaming data of the applicant. The applicant's gaming data may be retrieved from servers 211 of electronic game providers. For instance, the computing device may transmit a request for the applicant's gaming data to the servers 211. The request may include an identifier of the applicant (e.g., name, gamer tag, or other identifying information). The request may also include a time period during which the applicant's gaming data is sought. For instance, the request may include a start date and time and an end date and time, and may request for any of the applicant's gaming data that occurred in between those dates and times. The servers 211 may retrieve the applicant's gaming data for the specified time period and transmit the gaming data to the computing device. In one or more arrangements, the computing device may have previously instructed the servers 211 to temporarily store the gaming data of its customer so that the gaming data may be retrieved upon request.

At step 906, the computing device may analyze the applicant's gaming data to identify the applicant's gaming behaviors. For example, the computing device may identify the different video games and/or video game types played by the applicant. The computing device may determine the number of points earned in a particular video game or type of video game. Further, the computing device may determine the number of events that were caused by the applicant in a particular video game or type of video game.

At step 908, the computing device may determine an insurance premium for the applicant based on a set of insurance premium rules that, as discussed above, were formulated based on the different gaming behaviors of unsafe drivers from the gaming behaviors of safe drivers (and/or vice versa). The computing device may identify each of the video games or types of video games played by the applicant and use this information to identify a subset of rules that is associated with those video games and/or video game types. For instance, the computing device might not use rules for particular video games and/or types of video games that were not played by the applicant. The computing device may then apply the applicant's gaming data to the subset of rules. Each rule may positively or negatively affect the applicant's insurance rate. Once the insurance rate has been determined, it may be provided to the applicant e.g., via the web-based portal, insurance agent, etc.

In one or more arrangements, gaming data of a driver or applicant may be obtained and/or otherwise retrieved from servers 211 with the permission of the driver or applicant.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

The invention claimed is:
1. A system comprising:
a driving analysis server comprising one or more processors, the driving analysis server configured to:
receive telematics data associated with a vehicle;

determine a safe driving score for a driver of the vehicle based on the telematics data and one or more thresholds;
calculate an amount of a safe driving currency to be awarded to the driver based on the safe driving score;
send the amount of the safe driving currency to a mobile device; and
the mobile device, wherein the mobile device is configured to:
determine that a route for a trip associated with the vehicle cannot be determined;
responsive to determining that the route cannot be determined, determine one or more third-party vendors that accept the safe driving currency and that are located within a user-selected distance from a current location of the vehicle, and location information of at least a subset of the one or more third-party vendors;
output a user interface comprising the subset and the location information to a display screen of the mobile device;
receive, via the user interface, a user selection of a first third-party vendor of the one or more third-party vendors; and
activate, responsive to receiving the user selection, a navigational application installed on the mobile device to begin navigating to the first third-party vendor.

2. The system of claim 1, wherein the driving analysis server is further configured to:
receive, from the mobile device, an indication that a trip has begun.

3. The system of claim 1, wherein the driving analysis server is further configured to:
receive, from one of the one or more third-party vendors, a second amount of safe driving currency spent on a benefit; and
deduct the second amount of safe driving currency of the driver spent on the benefit from a safe driving currency account of the driver.

4. The system of claim 1, wherein the driving analysis server is further configured to:
determine whether the driver has obtained a streak of safe driving trips, wherein a safe driving trip is a trip for which the driver obtained a safe driver score greater than or equal to a minimum score threshold; and
in response to determining that the driver has obtained the streak of safe driving trips, award a second amount of safe driving currency to the driver.

5. The system of claim 1, wherein the driving analysis server is further configured to:
determine whether the driver has filled a stamp booklet associated with safe driving trips, wherein the driver receives a stamp for each safe driving trip, wherein a safe driving trip is a trip for which the driver obtained a safe driver score greater than or equal to a minimum score threshold; and
in response to determining that the driver has filled the stamp booklet, award a second amount of safe driving currency to the driver.

6. The system of claim 1, wherein the driving analysis server is further configured to:
receive, from a plurality of contestants, registrations to compete in a safe driving contest;
set up a first round of matches, wherein each match places two contestants against one another;
receive telematics data for each contestant over a particular time period;
determine a safe driver score for each contestant based on the telematics data of the contestant;
determine a winner of each match based on which contestant of the plurality of contestants has a higher safe driving score;
in response to determining that there are a plurality of winners in the first round of matches, set up a second round of matches with the winners of each match from the first round of matches; and
in response to determining that there is only one winner left, award safe driving currency to that winner.

7. The system of claim 1, wherein the driving analysis server is further configured to:
receive, from a second mobile device of a person, an identification of a driver of a public transport; and
send, to the second mobile device of the person, a safe driver score of the driver of the public transport for display to the person.

8. The system of claim 1, wherein the driving analysis server is further configured to:
identify first gaming behaviors of safe drivers that are different from second gaming behaviors of unsafe drivers; and
generate one or more rules for use in determining an insurance premium, wherein the one or more rules are based on the first gaming behaviors of safe drivers that are different from the second gaming behaviors of unsafe drivers.

9. The system of claim 8, wherein the driving analysis server is further configured to:
receive an application for insurance from an applicant;
obtain gaming data of the applicant; and
apply the gaming data of the applicant to at least one rule of the one or more rules to determine an insurance premium for the applicant.

10. A computing device comprising:
one or more processors; and
memory storing computer-readable instructions that, when executed by the one or more processors, cause the computing device to:
receive telematics data associated with a vehicle;
send the telematics data to a second computing device;
receive, from the second computing device, an amount of safe driving currency;
determine that a route for a trip associated with the vehicle cannot be determined;
responsive to determining that the route cannot be determined, determine one or more third-party vendors that accept the safe driving currency and that are located within a user-selected distance from a current location of the vehicle, and location information of at least a subset of the one or more third-party vendors;
output a user interface comprising the subset and the location information to a display screen of the computing device;
receive, via the user interface, a user selection of a first third-party vendor of the one or more third-party vendors; and
activate, responsive to receiving the user selection, a navigational application installed on the computing device to begin navigating to the first third-party vendor.

11. The computing device of claim 10, the memory storing computer-readable instructions that, when executed by the one or more processors, cause the computing device to:

determine, based on the telematics data, that the trip has begun.

12. The computing device of claim 10, the memory storing computer-readable instructions that, when executed by the one or more processors, cause the computing device to:
receive, from one of the one or more third-party vendors, a second amount of safe driving currency spent on a benefit; and
deduct the second amount of safe driving currency of a driver spent on the benefit from a safe driving currency account of the driver.

13. A method comprising:
receiving, by a mobile device, telematics data associated with a vehicle;
sending, by the mobile device, the telematics data to a computing device;
receiving, by the mobile device and from the computing device, an amount of safe driving currency;
determining, by the mobile device, that a route for a trip associated with the vehicle cannot be determined;
responsive to determining that the route cannot be determined, determining, by the mobile device, one or more third-party vendors that accept the safe driving currency and that are located within a user-selected distance from a current location of the vehicle, and location information of at least a subset of the one or more third-party vendors;
outputting, by the mobile device, a user interface comprising the subset and the location information to a display screen of the mobile device;
receiving, by the mobile device and via the user interface, a user selection of a first third-party vendor of the one or more third-party vendors; and
activating, by the mobile device and responsive to receiving the user selection, a navigational application installed on the computing device to begin navigating to the first third-party vendor.

14. The method of claim 13, further comprising:
determining, by the mobile device and based on the telematics data, that the trip has begun.

15. The method of claim 13, further comprising:
receiving, by the mobile device and from one of the one or more third-party vendors, a second amount of safe driving currency spent on a benefit; and
deducting, by the mobile device, the second amount of safe driving currency of a driver spent on the benefit from a safe driving currency account of the driver.

* * * * *